United States Patent
O'Hara

(10) Patent No.: US 11,925,879 B2
(45) Date of Patent: Mar. 12, 2024

(54) SYSTEMS AND METHODS FOR SEPARATING RADIUM FROM LEAD, BISMUTH, AND THORIUM

(71) Applicant: BATTELLE MEMORIAL INSTITUTE, Richland, WA (US)

(72) Inventor: Matthew J. O'Hara, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 604 days.

(21) Appl. No.: 16/894,679

(22) Filed: Jun. 5, 2020

(65) Prior Publication Data

US 2021/0024365 A1 Jan. 28, 2021

Related U.S. Application Data

(60) Provisional application No. 62/857,681, filed on Jun. 5, 2019.

(51) Int. Cl.
*B01D 15/20* (2006.01)
*B01D 15/18* (2006.01)
(Continued)

(52) U.S. Cl.
CPC ....... *B01D 15/203* (2013.01); *B01D 15/1871* (2013.01); *B01J 20/103* (2013.01);
(Continued)

(58) Field of Classification Search
None
See application file for complete search history.

(56) References Cited

U.S. PATENT DOCUMENTS

| 4,663,129 | A | * | 5/1987 | Atcher | ..... | G21G 4/08 |
|---|---|---|---|---|---|---|
| | | | | | | 423/2 |
| 5,322,644 | A | | 6/1994 | Dunn et al. | | |

(Continued)

FOREIGN PATENT DOCUMENTS

| EP | 3174068 | 5/2017 |
|---|---|---|
| EP | 20818030 | 4/2023 |

(Continued)

OTHER PUBLICATIONS

Horwitz et al. (Analytica Chimica Acta, 1994, 292, 263-273). (Year: 1994).*

(Continued)

*Primary Examiner* — Clare M Perrin
(74) *Attorney, Agent, or Firm* — Wells St. John P.S.

(57) ABSTRACT

Methods for separating Ra from Pb, Bi, and Th are provided, the methods can include: providing a first mixture comprising Ra, Pb, Bi, and/or Th; providing a system that can include: a first vessel housing a first media; a second vessel in fluid communication with the first vessel, the second vessel housing a second media; and a third vessel in fluid communication with the second vessel, the third vessel housing a third media; and exposing the first mixture to the first media within the first vessel then, through the fluid communication, exposing the first remainder to the second media in the second vessel, then, through fluid communication, exposing the next remainder to the third media in the third vessel, the exposing separating the Th and Bi from the Ra and Pb, and the Ra from the Pb. Methods for separating Ra from being associated with a media are also provided. The methods can include: exposing the Ra and media to a chelating agent to form a mixture comprising the Ra complexed with the chelating agent.

6 Claims, 32 Drawing Sheets

A

(51) Int. Cl.
    *B01J 20/10*       (2006.01)
    *B01J 20/26*       (2006.01)
    *B01J 20/28*       (2006.01)
    *B01J 20/283*     (2006.01)
    *B01J 20/285*     (2006.01)
    *B01J 20/34*       (2006.01)
    *C01G 21/00*     (2006.01)
    *C01G 29/00*     (2006.01)
    *C22B 3/42*       (2006.01)
    *C22B 26/20*     (2006.01)
    *G21G 1/00*      (2006.01)

(52) U.S. Cl.
    CPC ....... *B01J 20/261* (2013.01); *B01J 20/28004* (2013.01); *B01J 20/28016* (2013.01); *B01J 20/283* (2013.01); *B01J 20/285* (2013.01); *B01J 20/3425* (2013.01); *B01J 20/3433* (2013.01); *B01J 20/3475* (2013.01); *C01G 21/003* (2013.01); *C01G 29/003* (2013.01); *C22B 3/42* (2013.01); *C22B 26/20* (2013.01); *G21G 1/001* (2013.01); *B01J 2220/52* (2013.01); *B01J 2220/603* (2013.01)

(56) References Cited

U.S. PATENT DOCUMENTS

| | | | |
|---|---|---|---|
| 5,707,922 | A | 1/1998 | Mimori et al. |
| 5,809,394 | A * | 9/1998 | Bray ................ C22B 60/0295 |
| | | | 423/6 |
| 5,863,439 | A | 1/1999 | Dietz et al. |
| 6,136,197 | A | 10/2000 | Egorov et al. |
| 6,416,668 | B1 | 7/2002 | Al-Samadi |
| 6,645,377 | B1 | 11/2003 | Egorov et al. |
| 6,780,326 | B2 | 8/2004 | Egorov et al. |
| 7,001,522 | B2 | 2/2006 | Egorov et al. |
| 7,157,022 | B2 * | 1/2007 | Horwitz ............... B01J 20/3204 |
| | | | 423/100 |
| 8,894,860 | B2 | 11/2014 | Li et al. |
| 2003/0127395 | A1 | 7/2003 | Bond et al. |
| 2006/0153760 | A1 | 7/2006 | Meikrantz et al. |
| 2008/0038169 | A1 | 2/2008 | Phan et al. |
| 2018/0047474 | A1 | 2/2018 | O'Hara |
| 2018/0308599 | A1 | 2/2018 | O'Hara |
| 2021/0188654 | A1 | 6/2021 | O'Hara et al. |

FOREIGN PATENT DOCUMENTS

| | | |
|---|---|---|
| WO | WO | 10/2020 |
| | PCT/US2020/036503 | |
| WO | WO | 8/2021 |
| | PCT/US2020/064710 | |
| WO | WO | 12/2021 |
| | PCT/US2020/036503 | |
| WO | WO | 5/2022 |
| | PCT/US2020/064710 | |

OTHER PUBLICATIONS

Korkisch et al. ("Anion Exchange Separation of Uranium, thorium and Bismuth", 1961, pp. 290-295). (Year: 1961).*
Monroy-Guzman et al. J. Chem. Chem. Eng., 2016, 10, 90-95. (Year: 2016).*
Atcher et al., "An Improved Generator for the Production of 212Pb and 212Bi from 224Ra", Applied Radiation and Isotopes vol. 39, No. 4, 1988, United Kingdom, pp. 283-286.
Dash et al., "Radionuclide Generators: The Prospect of Availing PET Radiotracers to Meet Current Clinical Needs and Future Research Demands", American Journal of Nuclear Medicine and Molecular Imaging 9(1), 2019, United States, pp. 30-66.

Horwitz et al., "A Novel Strontium-Selective Extraction Chromatographic Resin", Solvent Extraction and Ion Exchange 10(2), 1992, United States, pp. 313-336.
Hyde, "The Radiochemistry of Thorium", Nuclear Science Series, NAS-NS 3004, National Academy of Sciences National Research Council, Jan. 1960, United States, 77 pages.
Ishimori et al., "Measurement and Calculation of Radon Releases from NORM Residues", International Atomic Energy Agency Technical Reports Series No. 474, 2013, Vienna, 95 pages.
Knapp Jr. et al., "Re-Emergence of the Important Role of Radionuclide Generators to Provide Diagnostic and Therapeutic Radionuclides to Meet Future Research and Clinical Demands", Journal of Radioanalytical and Nuclear Chemistry 302, 2014, Netherlands, pp. 1053-1068.
NIDC, "DOE Isotope Program Announces Availability of Radium-224/Lead-212 Generators", Notice #38, Mar. 13, 2015, available online at https://www.isotopes.gov/node/123, 1 page.
Westrøm, et al., "Preparation of 212Pb-Labeled Monoclonal Antibody using a Novel 224Ra-Based Generator Solution", Nuclear Medicine and Biology 51, 2017, United States, pp. 1-9.
Zhao et al., "An Initial Study of EDTA Complex Based Draw Solutes in Forward Osmosis Process", Desalination 378, 2016, Netherlands, pp. 28-36.
Bunney et al., "Quantitative Radiochemical Analysis by Ion Exchange. Anion Exchange Behavior of Several Metal Ions in Hydrochloric, Nitric, and Sulfuric Acid Solutions", Analytical Chemistry 31, 1959, United States, pp. 324-326.
Dudzinska et al., "Anion Exchange Studies of Lead-EDTA Complexes", Reactive Polymers vol. 16, 1991, Netherlands, pp. 71-80.
Faris et al., "Anion Exchange Characteristics of the Elements in Nitric Acid Medium", Analytical Chemistry 36, 1964, United States, pp. 1157-1158.
Grate et al., "Extraction Chromatographic Methods in the Sample Preparation Sequence for Thermal Ionization Mass Spectrometric Analysis of Plutonium Isotopes", Analytical Chemistry 83, 2011, United States, pp. 9086-9091.
Horwitz et al., "Separation and Preconcentration of Actinides by Extraction Chromatography using a Supported Liquid Anion Exchanger: Application to the Characterization of High-Level Nuclear Waste Solutions", Analytica Chimica Acta 310, 1995, Netherlands, pp. 63-78.
IBC Advanced Technologies, "AnaLig Data Sheet: Ra-01", IBC 10604.Rev 1. IBC Advanced Technologies, Inc. American Fork, UT. p. 1.
Karhu et al., "Determination of the Solubility Products of Nitrilotriacetic Acid, Ethylenediaminetetraacetic Acid and Diethylenetriaminepentaacetic Acid", Analytica Chimica Acta vol. 380, 1999, Netherlands, pp. 105-111.
Li et al., "Automated Cassette-Based Production of High Specific Activity [203/212pb] Peptide-Based Theranostic Radiopharmaceuticals for Image-Guided Radionuclide Therapy for Cancer", Applied Radiation and Isotopes 127, 2017, United Kingdom, pp. 52-60.
Maxwell et al., "Rapid Fusion Method for the Determination of Refractory Thorium and Uranium Isotopes in Soil Samples", Journal of Radioanalytical and Nuclear Chemistry vol. 305, 2015, Netherlands, pp. 631-641.
ORNL, "Standard Operating Procedure for ORNL Radium-224 (t1/2=3.66 d)/Lead-212 (t1/2=10.64 h) Generator System", Oak Ridge National Laboratory: Oak Ridge, TN. 2009, p. 1-4.
Strelow, "Distribution Coefficients and Ion Exchange Behavior of 46 Elements with a Macroreticular Cation Exchange Resin in Hydrochloric Acid", Analytical Chemistry 56 (6), 1984, United States, pp. 1053-1056.
Verlinde et al., "A New Rapid Protocol for 226Ra Separation and Preconcentration in Natural Water Samples using Molecular Recognition Technology for ICP-MS Analysis", Journal of Environmental Radioactivity vol. 202, 2019, United Kingdom, pp. 1-7.
Kah et al., "Sorption of ionizable and ionic organic compounds to biochar, activated carbon and other carbonaceous materials", Water Research 124, 2017, United Kingdom, pp. 673-692.
Kraus et al., "Fig. 3—Adsorption of the Elements from Hydrochloric Acid", Proceedings of the International Conference on the Peaceful Uses of Atomic Energy, vol. 7, p. 113, Session 9B1, P/837, United Nations (1956).

(56) References Cited

OTHER PUBLICATIONS

Martell et al., "Critical Stability Constants", vol. 5: First Supplement, Springer Science+Business Media, New York, 1982, pp. 1-58.

* cited by examiner

SYSTEMS AND METHODS FOR SEPARATING RADIUM FROM LEAD, BISMUTH, AND THORIUM

CROSS REFERENCE TO RELATED APPLICATION

This application claims priority to and the benefit of U.S. Provisional Patent Application Ser. No. 62/857,681 filed Jun. 5, 2019, entitled "Separation of Radium from Lead, Bismuth, and Thorium for Medical Isotope Production Applications", the entirety of which is incorporated by reference herein.

STATEMENT AS TO RIGHTS TO DISCLOSURES MADE UNDER FEDERALLY-SPONSORED RESEARCH AND DEVELOPMENT

This disclosure was made with Government support under Contract DE-AC0576RL01830 awarded by the U.S. Department of Energy. The Government has certain rights in the invention.

TECHNICAL FIELD

The disclosure generally relates to nuclear medicine and more particularly to methods for obtaining materials and performing separations for generating such materials.

BACKGROUND

In the field of nuclear medicine separations of materials and preparation of materials for inclusion in various treatments face a number of obstacles. Availability, cost, timing, and limited shelf-life coupled with the need to perform many activities in specialized safe facilities create a number of obstacles. The existing method of $^{212}$Pb/$^{212}$Bi generator preparation requires two steps: first $^{224}$Ra must be isolated from a $^{228}$Th stock solution; second the $^{224}$Ra must be loaded onto a cation exchange (CatIX) resin (which becomes the $^{212}$Pb/$^{212}$Bi generator column), the performance of which can expose staff to a high radiological dose. The dose is largely caused by the short-lived progeny below $^{212}$Po. In addition, this method is cumbersome and labor intensive and can requires multiple columns and boildown steps to achieve the desired ends.

What are needed are more and more improved methods for simplifying these processes, increasing the yields and addressing the various barriers to use. The following description provides various examples and advances in this regard.

SUMMARY

Systems for separating Ra from a mixture comprising at least Ra, Pb, Bi, and Th are provided. The systems can include: a first vessel housing a first media and either Pb or Bi and/or Th; and a second vessel in fluid communication with the first vessel, the second vessel housing a second media and Ra, wherein the first media is different from the second media.

Systems for separating Ra from a mixture comprising at least Ra, Pb, Bi, and Th are also provided that can include a first vessel housing a first media and Th and/or Bi; and a second vessel in fluid communication with the first vessel, the second vessel housing a first media and Pb, wherein the first media is different from the second media.

Additional systems for separating Ra from a mixture comprising at least Ra, Pb, Bi, and Th can include: a first vessel housing a first media and Th or Bi; a second vessel in fluid communication with the first vessel, the second vessel housing a second media and Pb; and a third vessel in fluid communication with the second vessel, the third vessel housing a third media and Ra, wherein at least one of the first, second, or third medias are different from the other medias.

Methods for separating Ra from Pb, Bi, and Th are provided, the methods can include: providing a first mixture comprising Ra, Pb, Bi, and/or Th; providing a system that includes: a first vessel housing a first media; and a second vessel in fluid communication with the first vessel, the second vessel housing a second media; exposing the first mixture to the first media within the first vessel to separate the Th and Bi from the Ra and Pb; then, through the fluid communication, exposing the remaining mixture to the second media in the second vessel to associate the Pb or Ra with the second media.

Methods for separating Ra from Pb, Bi, and Th can also provide for providing a first mixture comprising Ra, Pb, Bi, and/or Th; providing a system that can include: a first vessel housing a first media; a second vessel in fluid communication with the first vessel, the second vessel housing a second media; and a third vessel in fluid communication with the second vessel, the third vessel housing a third media; and exposing the first mixture to the first media within the first vessel then, through the fluid communication, exposing the first remainder to the second media in the second vessel, then, through fluid communication, exposing the next remainder to the third media in the third vessel, the exposing separating the Th and Bi from the Ra and Pb, and the Ra from the Pb.

Methods for separating Ra from being associated with a media are also provided. The methods can include: exposing the Ra and media to a chelating agent to form a mixture comprising the Ra complexed with the chelating agent.

Methods for separating Ra from Pb, Bi, and Th are also provided that can include: providing a first mixture comprising Ra and at least Bi and/or Th; separating one or more of Bi and/or Th from the Ra, the separating associating the Bi and/or Th with a first media; and disassociating the Bi and/or Th from the first media to form a mixture comprising the Bi and Th and transferring the mixture to a vessel housing at least Ra and additional Bi and/or Th.

DRAWINGS

Embodiments of the disclosure are described below with reference to the following accompanying drawings.

Figure 2:
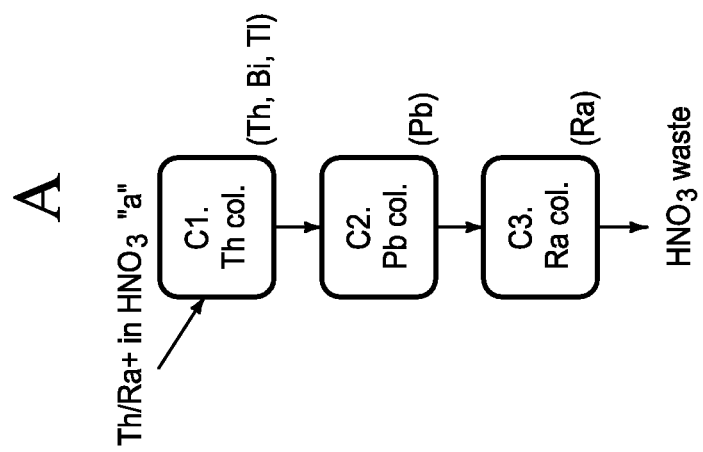
FIG. 2 is a depiction of Step A: Initial 3-column load of $^{228}$Th stock+wash "a".
Figure 3:
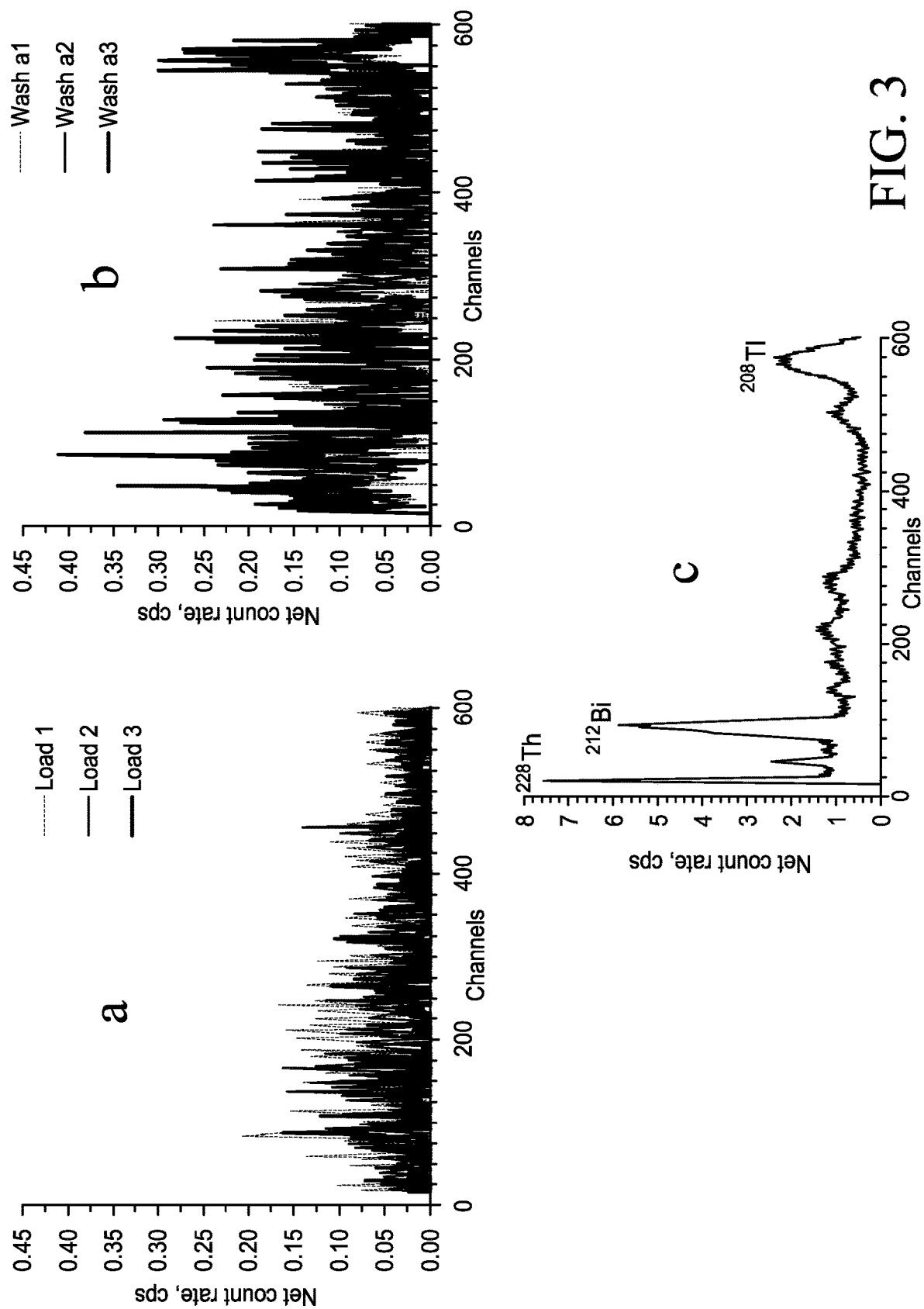

FIG. 3 depicts gamma spectra obtained following triple-column load/wash routine (see path A in FIG. 2). The $^{228}$Th/progeny sample is loaded (a) and washed (b) through all three columns using 6 M HNO$_3$; no activity is observed to break through the three-column stack. (c) Following load and wash steps, the AnIX$_{poly}$ media (C1) shows $^{228}$Th, $^{212}$Bi, and $^{208}$Tl adsorbed on the resin beads.

Figure 4:
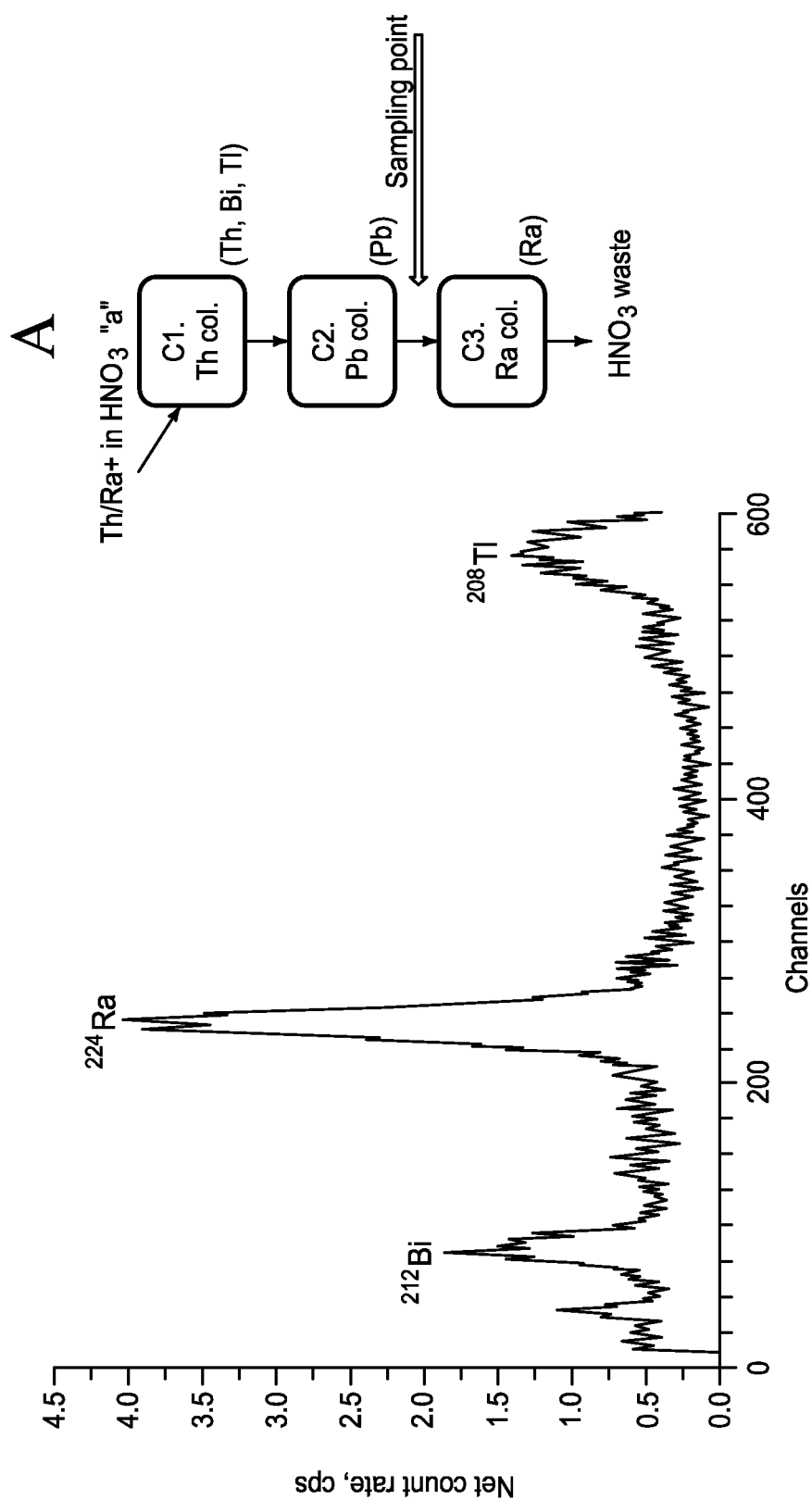

FIG. 4 depicts gamma spectrum showing a prominent $^{224}$Ra emission in a fraction collected immediately downstream of C2 during the wash "a" sequence. Traces of $^{212}$Bi/$^{208}$Tl, likely generated by the $^{212}$Pb adsorbed on C2, are likewise observed.

Figure 5:
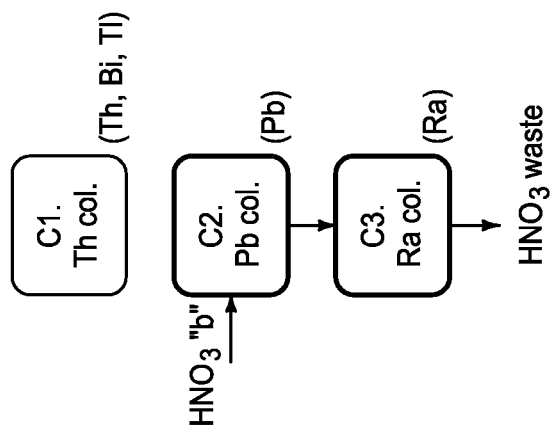

FIG. 5 depicts Step B: C2+C3 wash "b".

Figure 6:
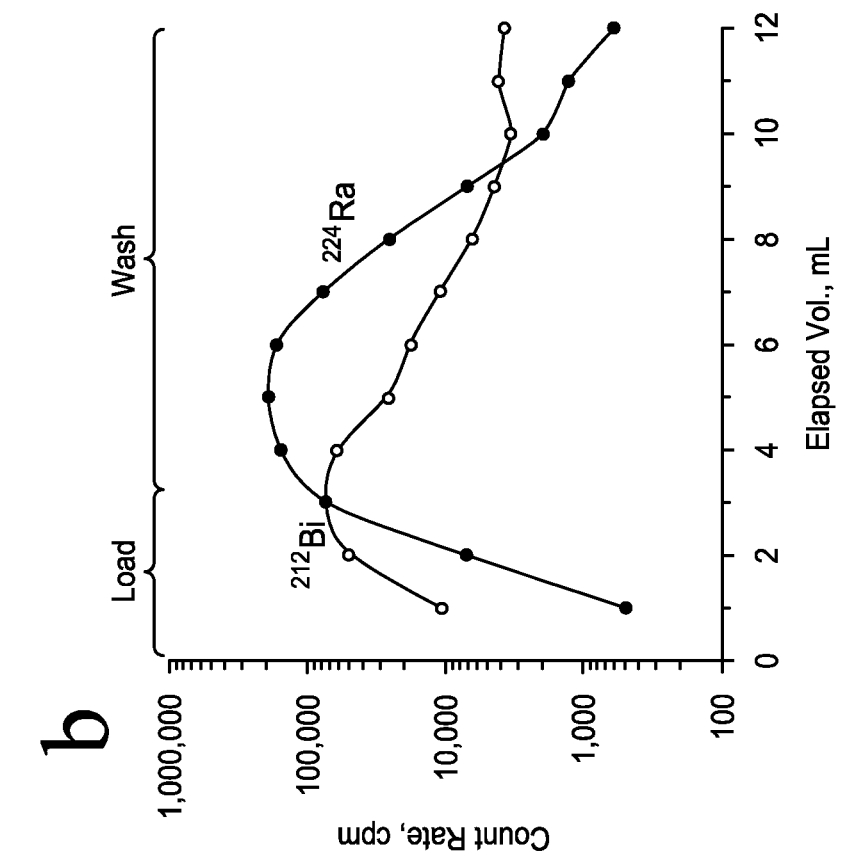
Figure 6:
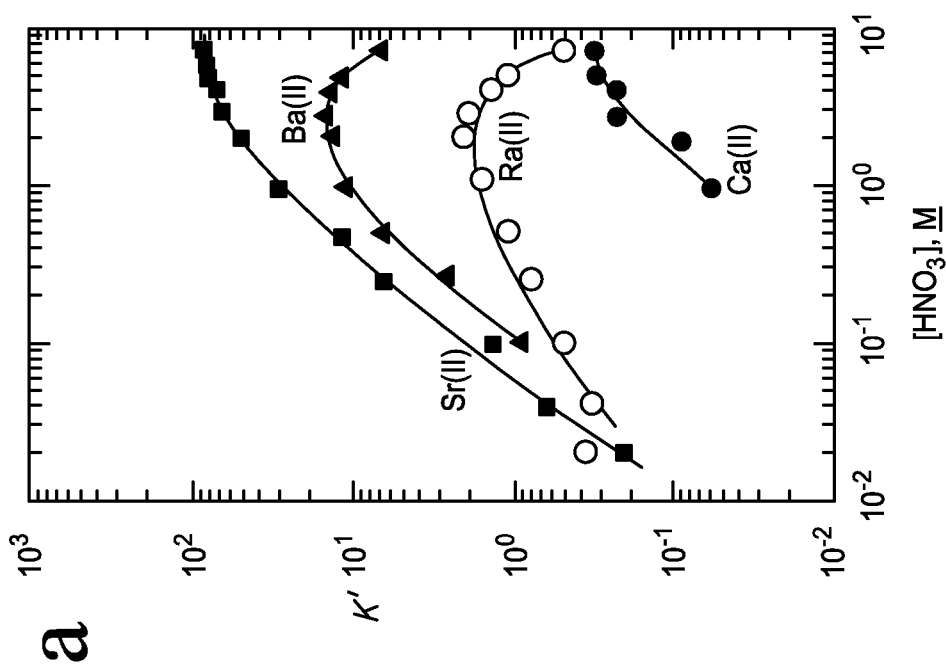

FIG. 6 depicts (a) Resin capacity factors (k') for Group II divalent cations in nitric acid on Sr Resin. (b) Sr Resin effluent fraction elution profiles for unretained $^{212}$Bi and slightly retained $^{224}$Ra in 2 M HNO$_3$.

Figure 7:
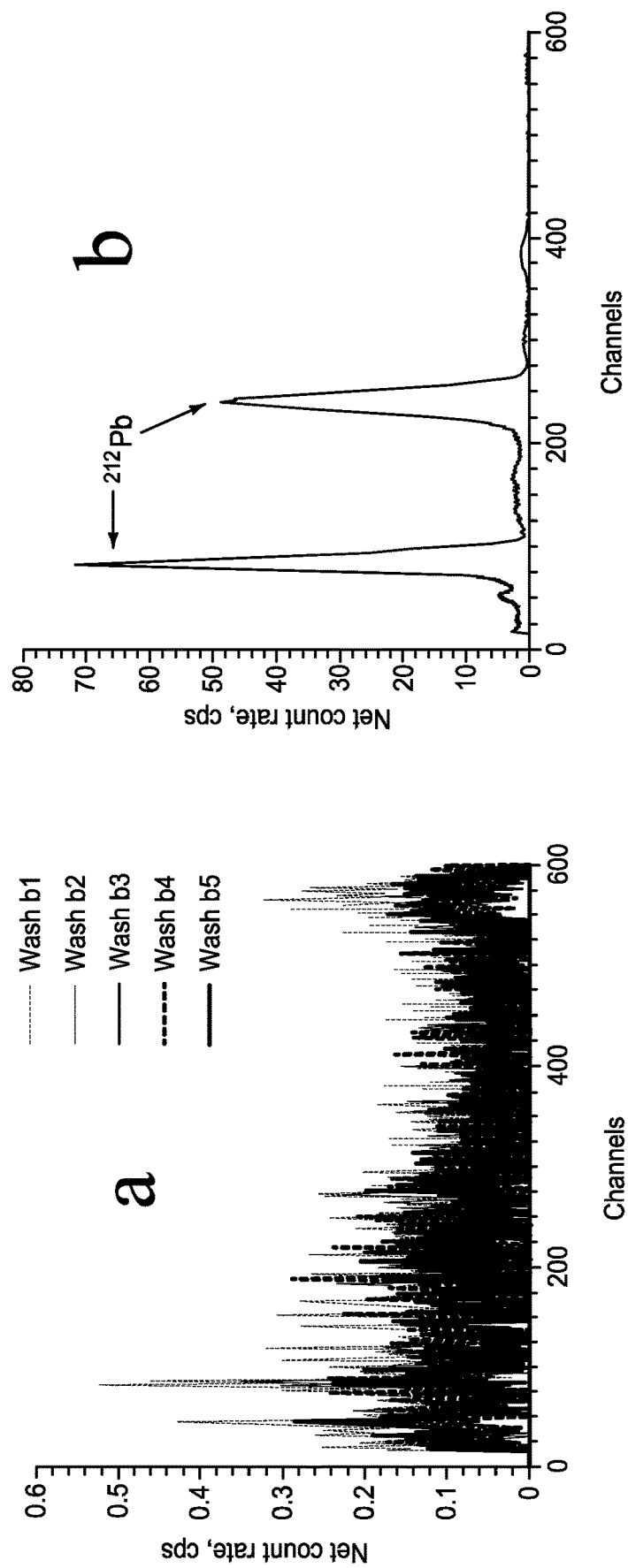

FIG. 7 depicts gamma spectra obtained following double-column load/wash routine (see path B in FIG. 5). (a) The $^{212}$Pb and $^{224}$Ra are washed through C2/C3 using 2 M HNO$_3$; no activity is observed to break through the two-column stack, as $^{212}$Pb is retained on the Sr Resin column (C2) and $^{224}$Ra is retained on the Ra-01 Resin column (C3). (b) Spectrum taken of the Sr Resin column (C2) at the conclusion of the wash "b" step shows pure $^{212}$Pb.

Figure 8:
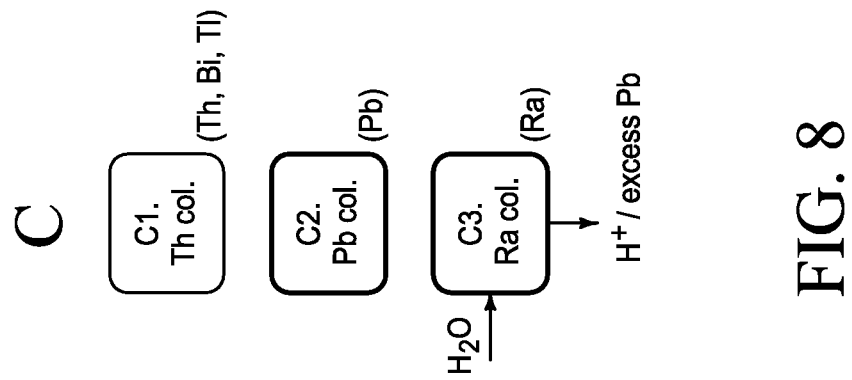

FIG. 8 is Step C: C3 water rinse.

Figure 9:
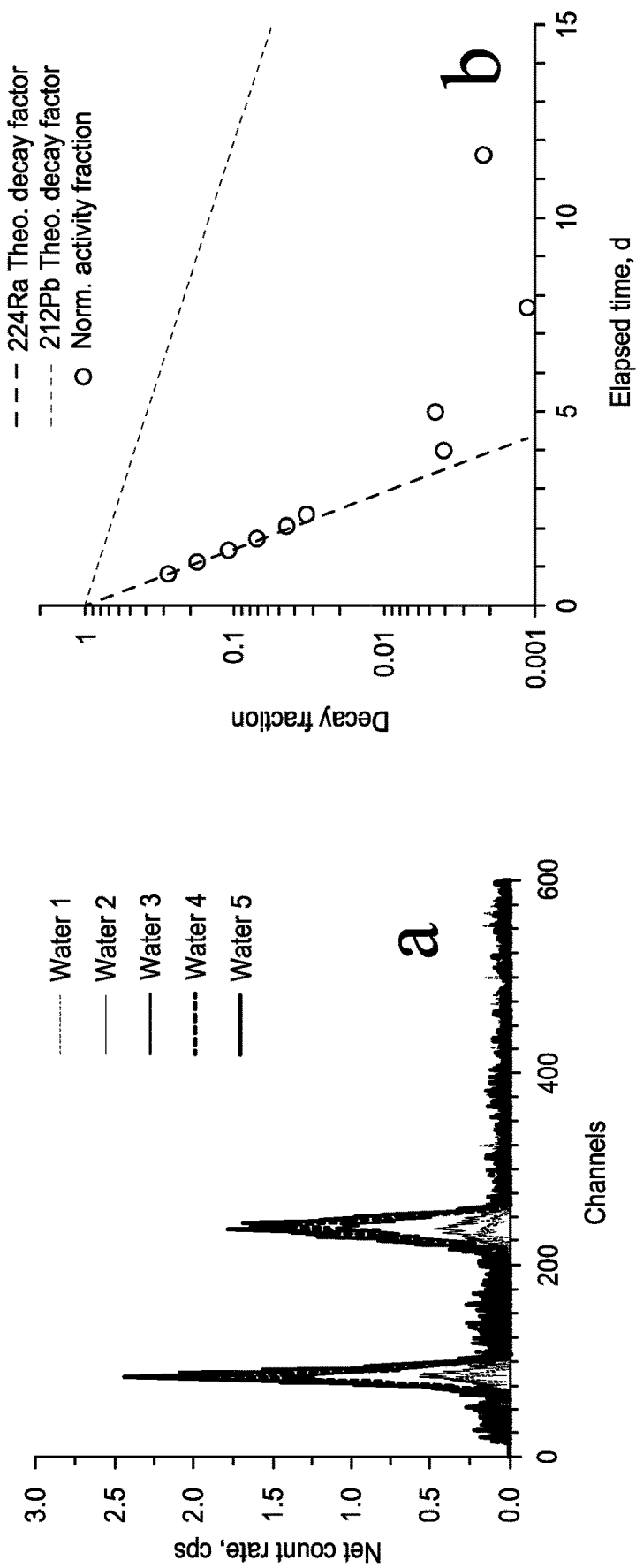

FIG. 9 depicts (a) Elution of residual $^{212}$Pb from the $^{224}$Ra-loaded C3 using water. (b) Decay rate of the water wash fractions indicated little to no $^{224}$Ra loss during the water wash step.

Figure 10:
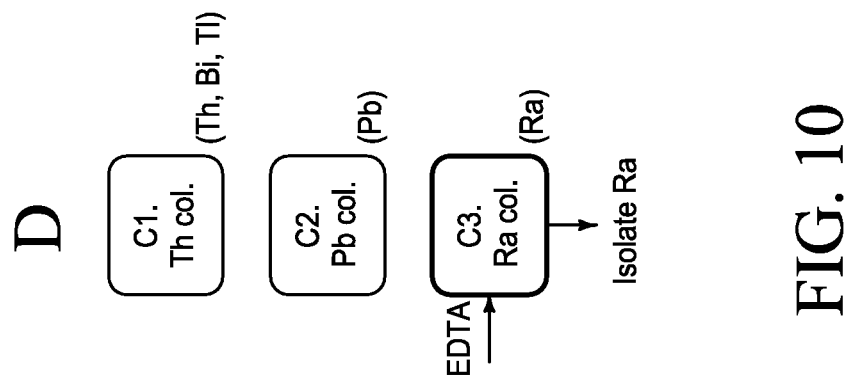

FIG. 10 is Step D: C3 elution of isolated $^{224}$Ra.

Figure 11:
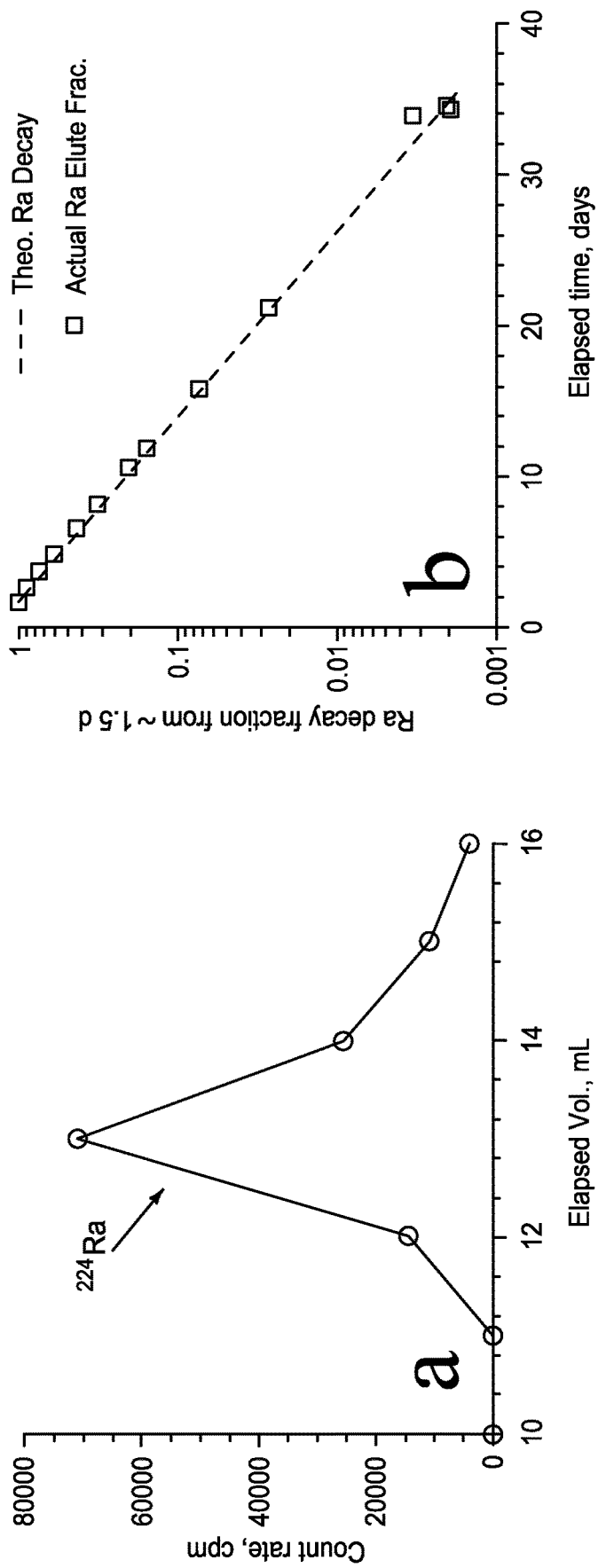

FIG. 11 depicts (a) Assembled radiochromatogram of $^{224}$Ra elute fractions. (b) Monitoring the isolated $^{224}$Ra fraction activity over the theoretical decay rate as a function of time shows that it is radionuclidically pure.

Figure 12:
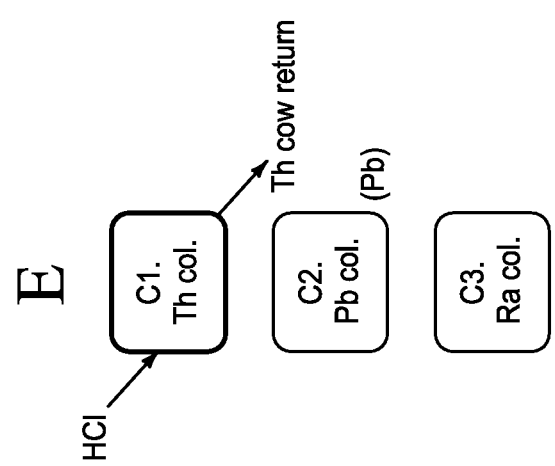

FIG. 12 is Step E: C1 elution of $^{228}$Th stock with HCl.

Figure 13:
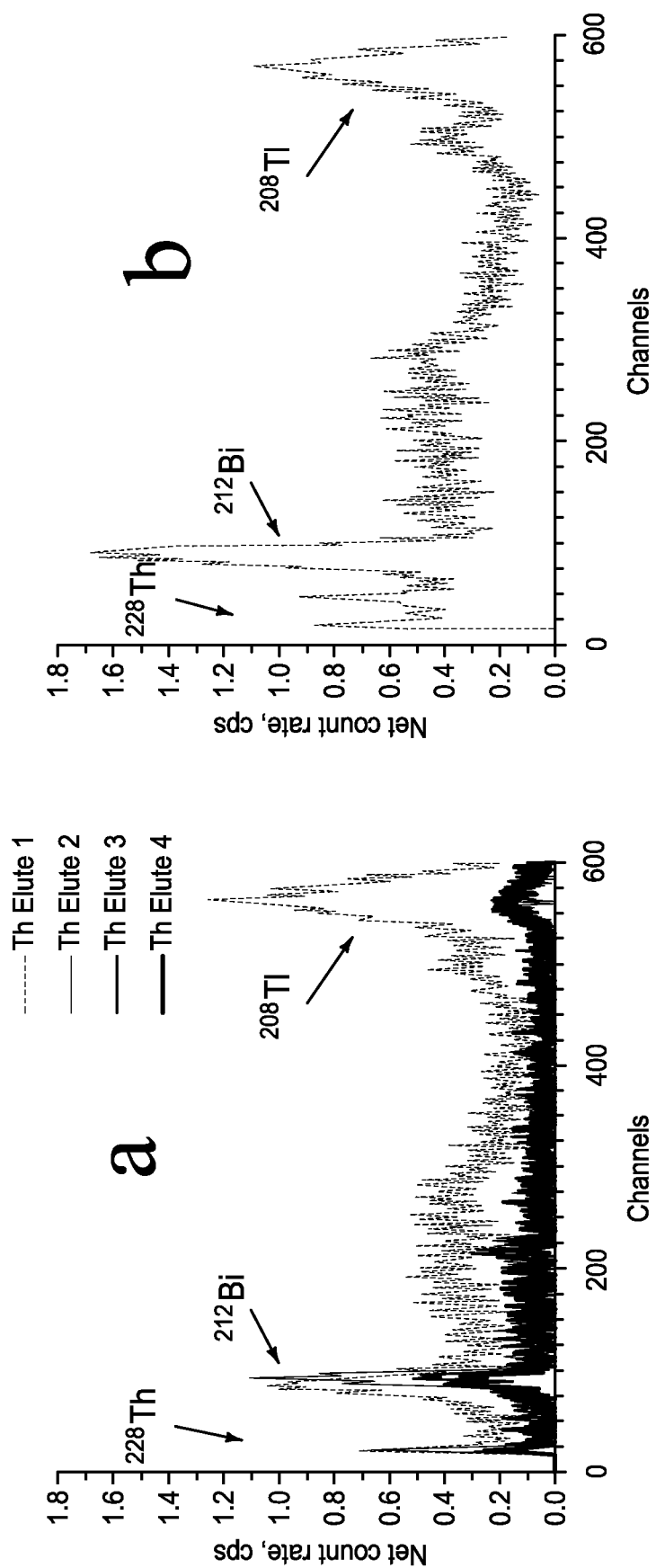

FIG. 13 is (a) Elution of $^{228}$Th, $^{212}$Bi, and $^{208}$Tl from the AnIX$_{poly}$ resin M1 using 8 M HCl. (b) Spectrum of the AnIX$_{poly}$ M1 following the HCl elution cycle indicates incomplete $^{228}$Th elution.

Figure 14:
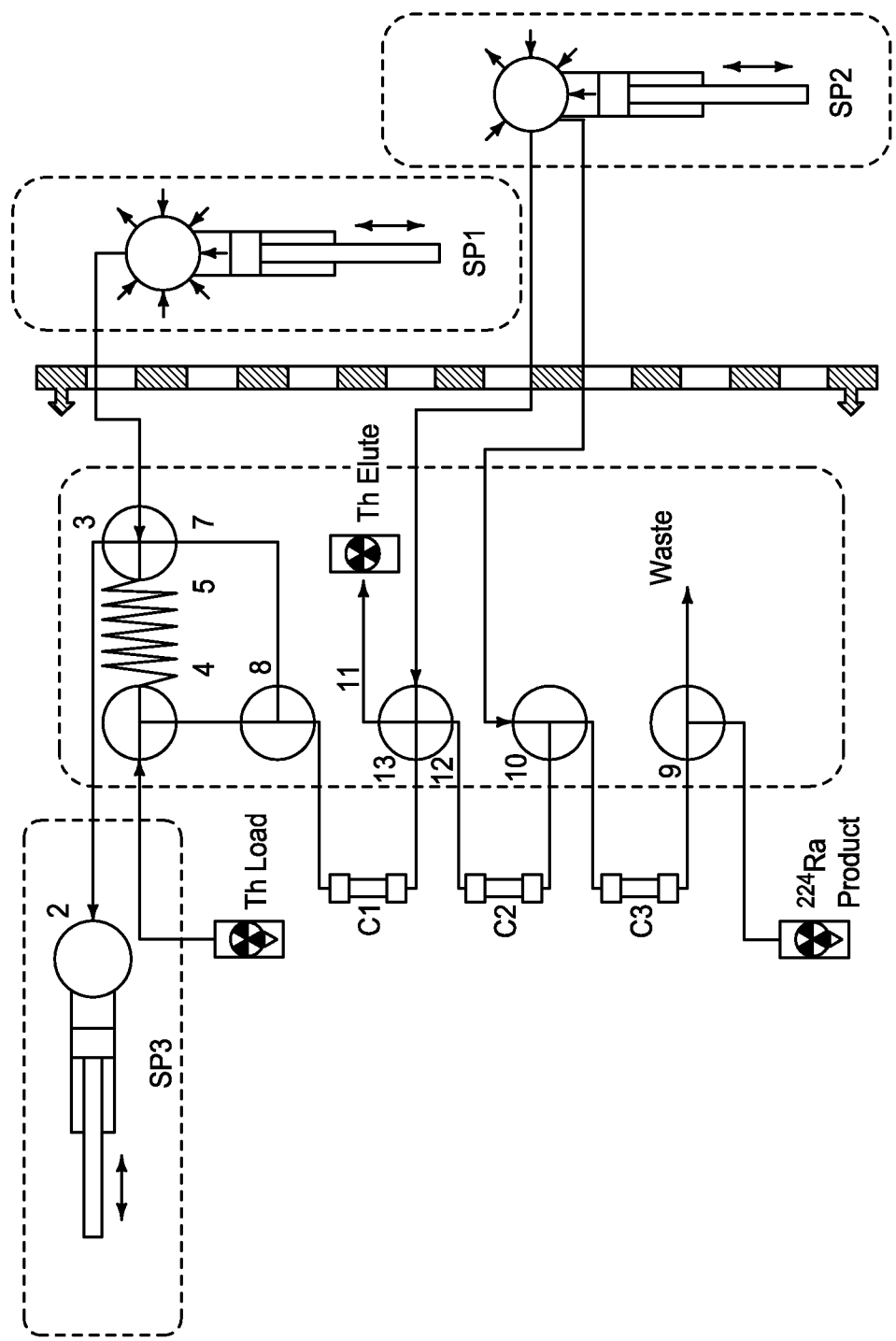

FIG. 14 is fluidic layout schematic of automated triple-column based $^{224}$Ra purification system according to an embodiment of the disclosure.

Figure 15:
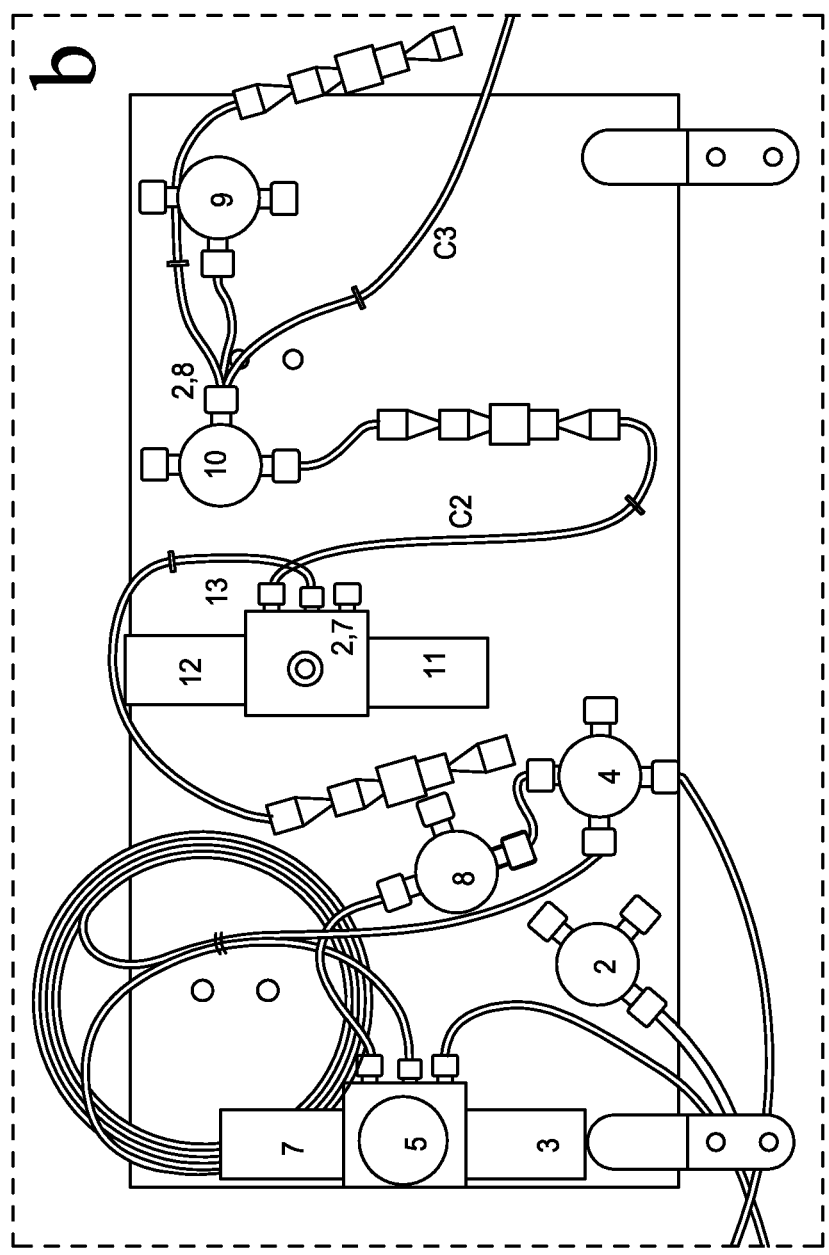
Figure 15:
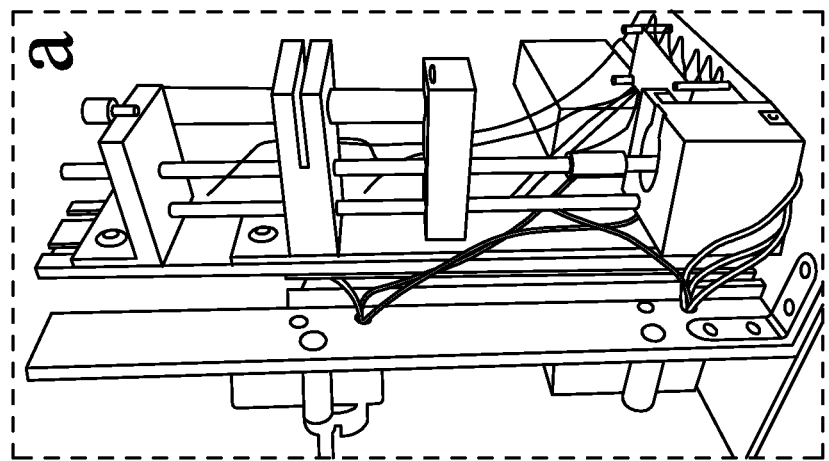

FIG. 15 depicts (a) stepper motor driven syringe pump for $^{228}$Th stock solution loading operations. (b) solenoid-based fluid routing system to drive the triple-column $^{224}$Ra isolation procedure according to embodiments of the disclosure.

Figure 16:
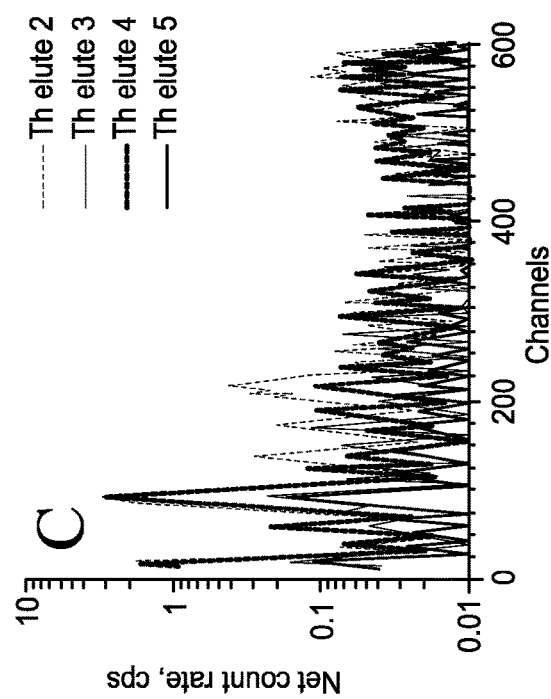
Figure 16:
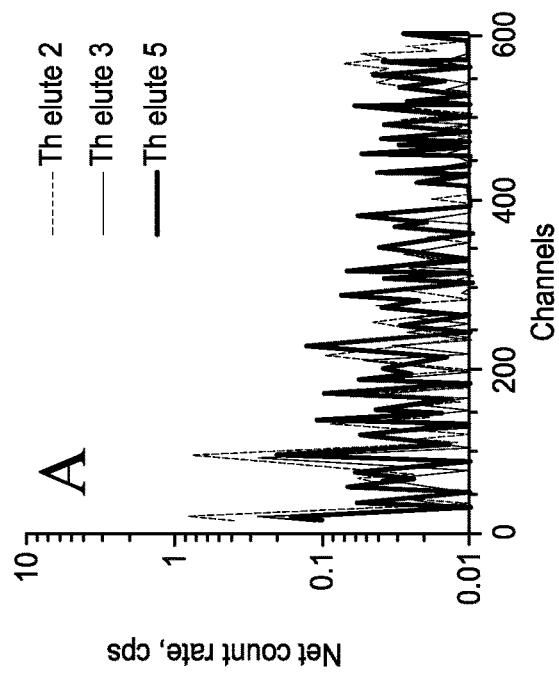
Figure 16:
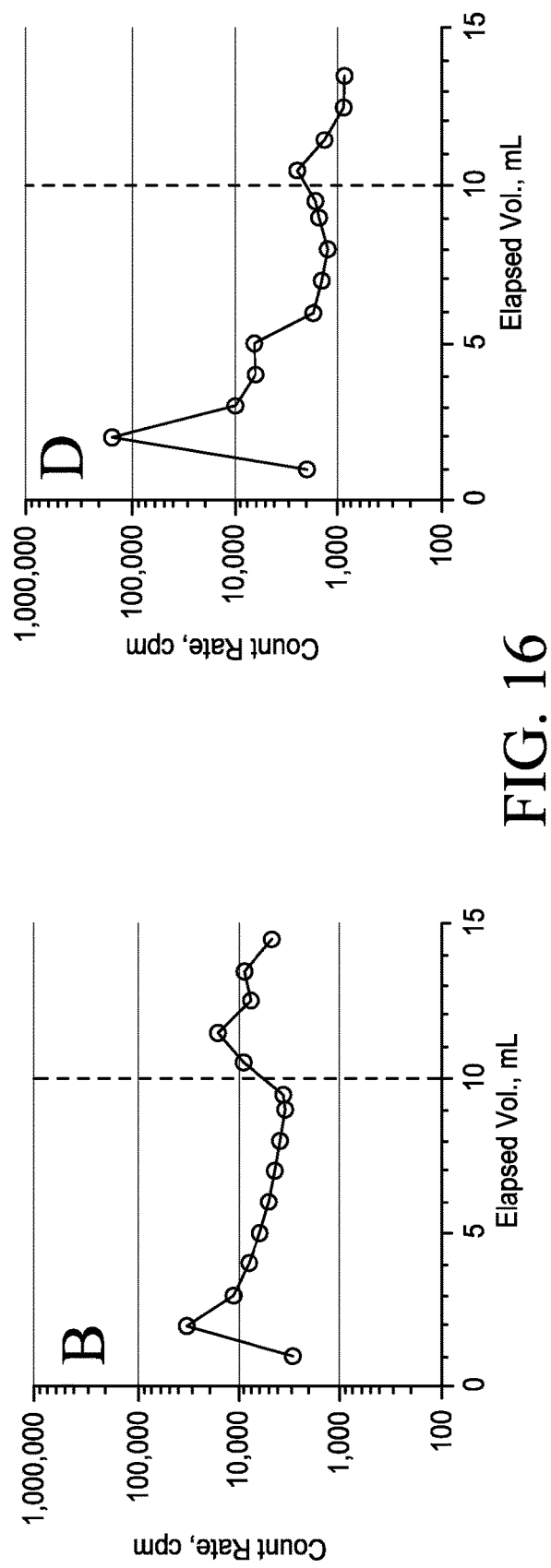

FIG. 16 is gamma spectra of $^{228}$Th elution fractions (A) and elution chromatogram (B) using 1 M HCl on MP-1M resin (M1). $^{228}$Th elution fractions (C) and elution chromatogram (D) using 8 M HCl on same. Dashed line at 10 mL indicates the beginning of an applied strip solution of EDTA.

Figure 17:
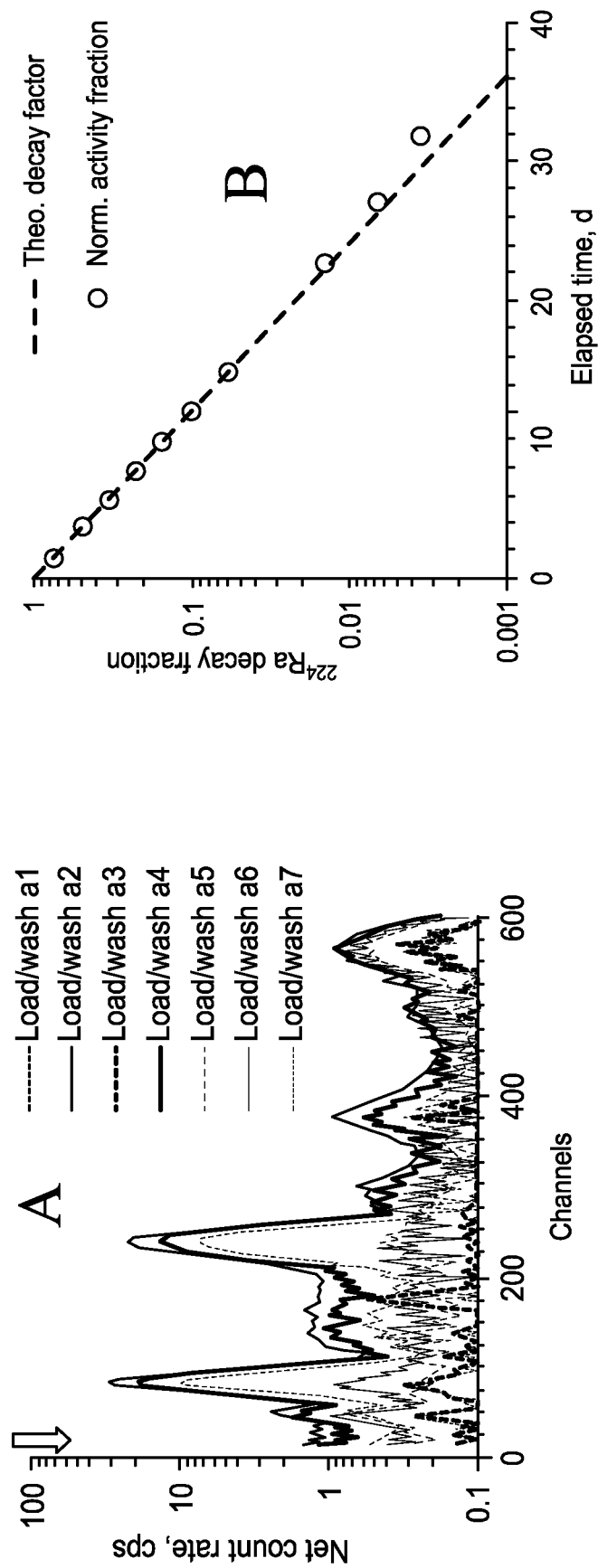

FIG. 17 depicts (A) Load and wash "a" fractions collected from 1 cc TEVA resin effluents in 6 M HNO$_3$. Arrow indicates the location of the absent $^{228}$Th X-ray. $^{212}$Pb, $_{212}$Bi and $^{208}$Tl photon peaks are observed to break through the media (the $^{224}$Ra emission is hidden under the $^{212}$Pb peak at ~240 keV). (B) Analysis of the TEVA resin effluents over time indicate a decay rate consistent with that of $^{224}$Ra; this indicates that $^{228}$Th was well adsorbed on the media during the load/wash "a" steps.

Figure 18:
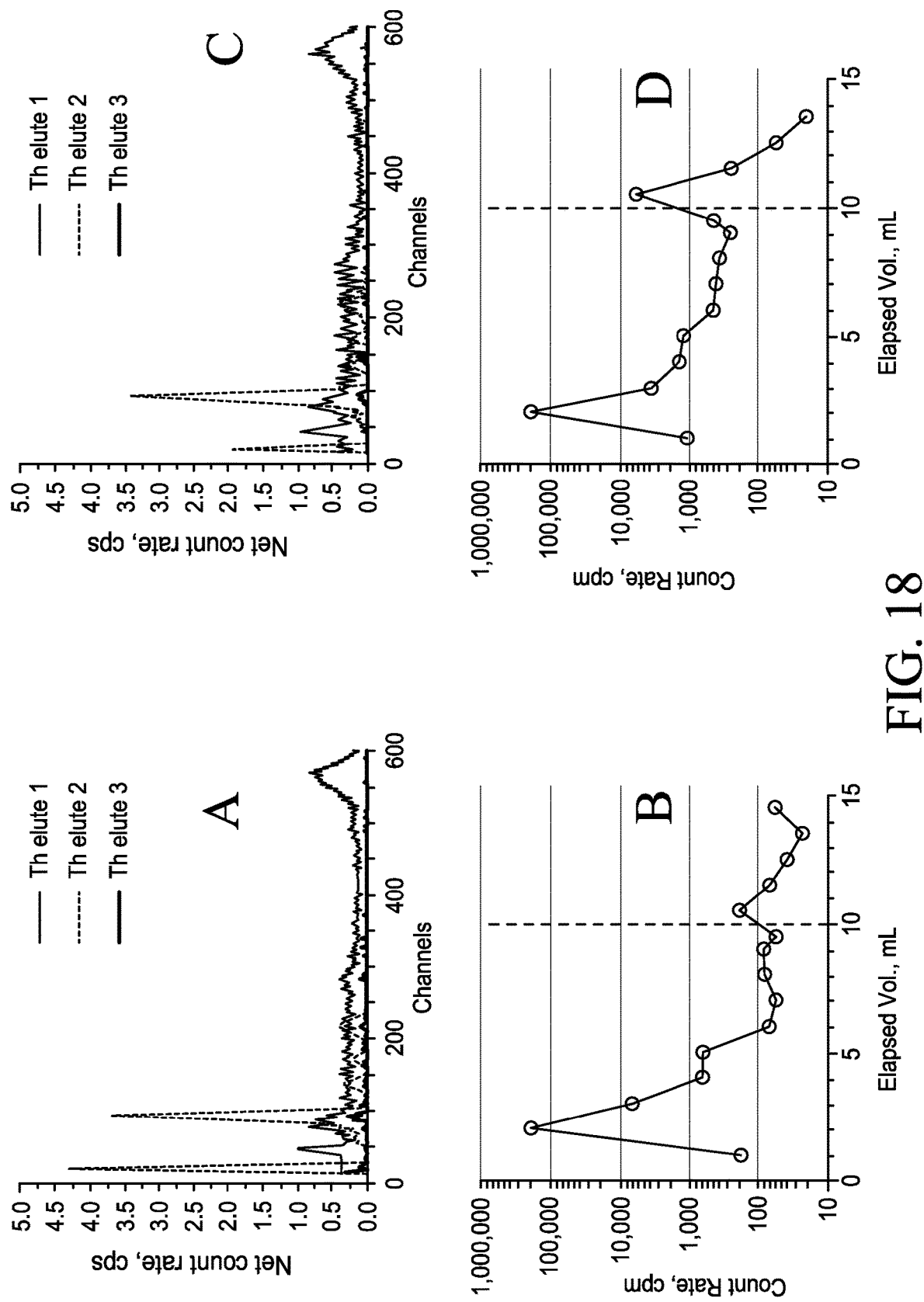

FIG. 18 depicts gamma spectra of $^{228}$Th elution fractions (A) and elution chromatogram (B) using 1 M HCl on TEVA resin (M1). $^{228}$Th elution fractions (C) and elution chromatogram (D) using 8 M HCl on same. Dashed line at 10 mL indicates the beginning of an applied strip solution of EDTA.

Figure 19:
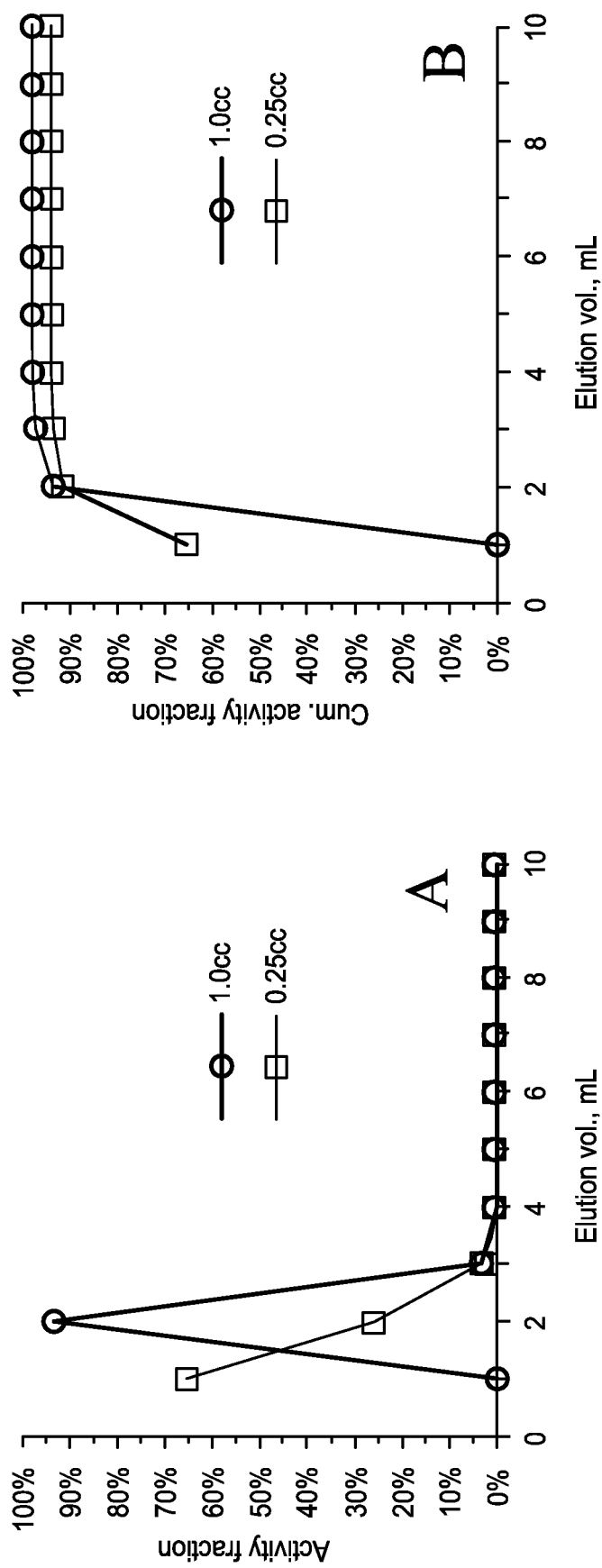

FIG. 19 depicts (A)$^{228}$Th activity fractions as a function of 1 M HCl elution volume from TEVA resins of different internal volumes. (B) Cumulative $^{228}$Th activity yield for same.

Figure 20:
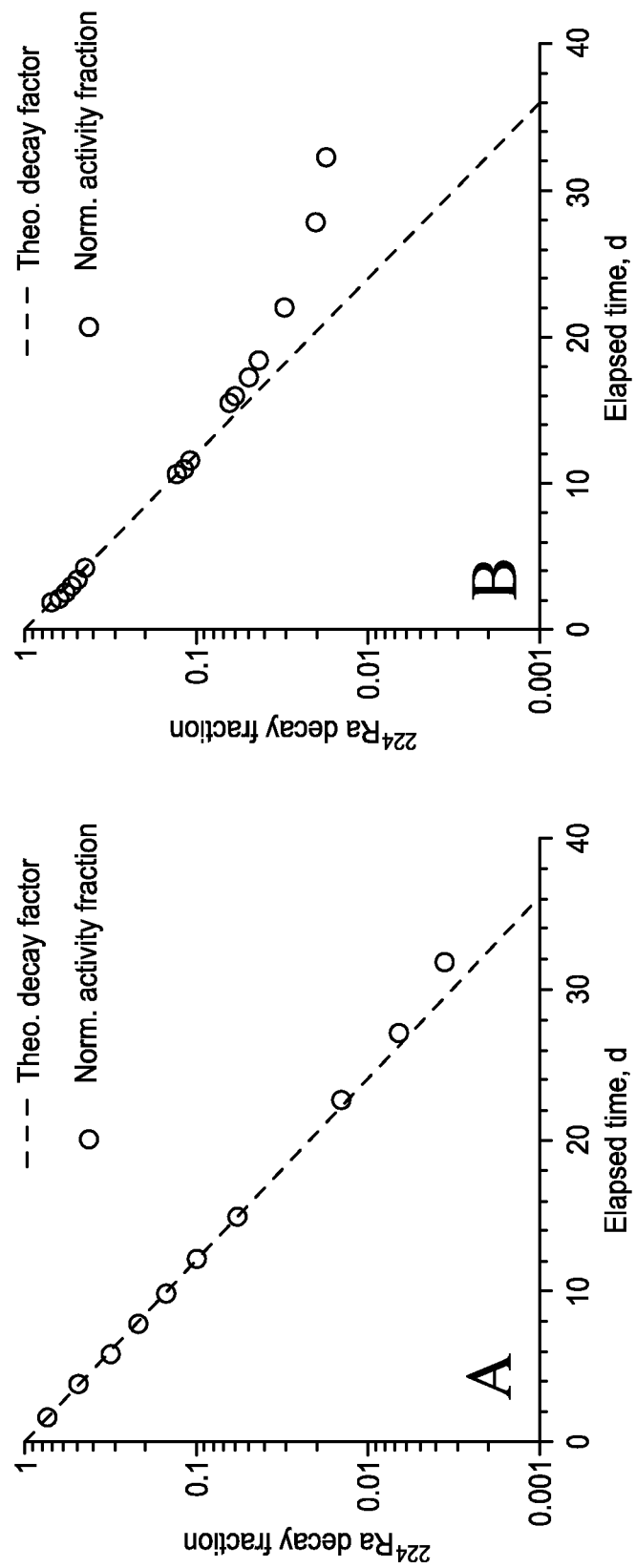

FIG. 20 depicts observed activity decay rate of TEVA resin load fraction (combined loads) for a 1 cc (A) vs. 0.25 cc (B) vessel volume. Dashed line is the theoretical decay rate for $^{224}$Ra. Positive deviation from the $^{224}$Ra curve indicates the presence of $^{228}$Th as TEVA resin column breakthrough.

Figure 21:
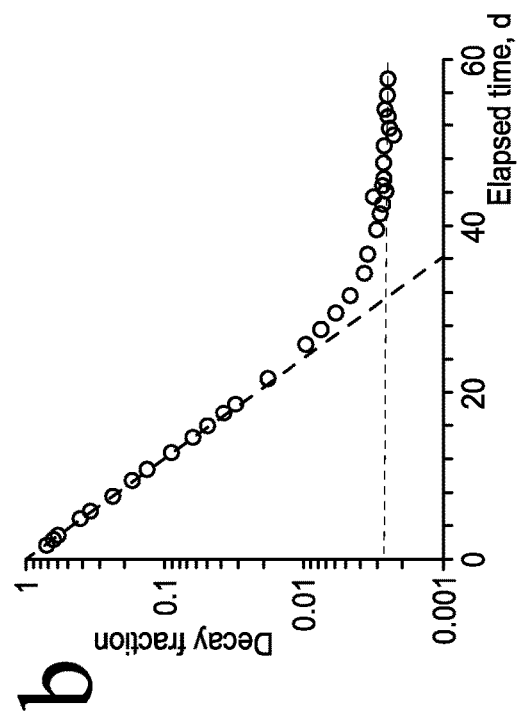
Figure 21:
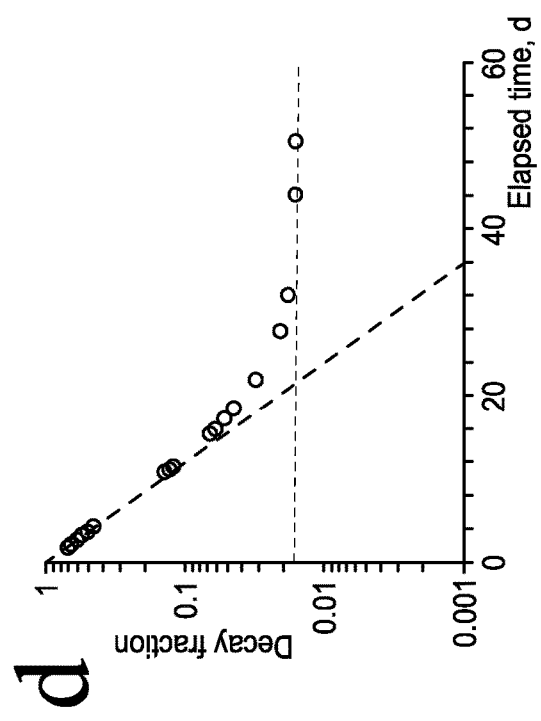
Figure 21:
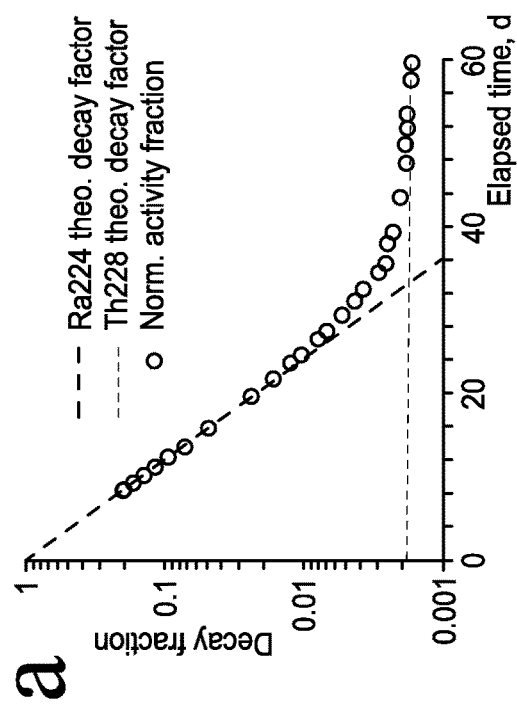
Figure 21:
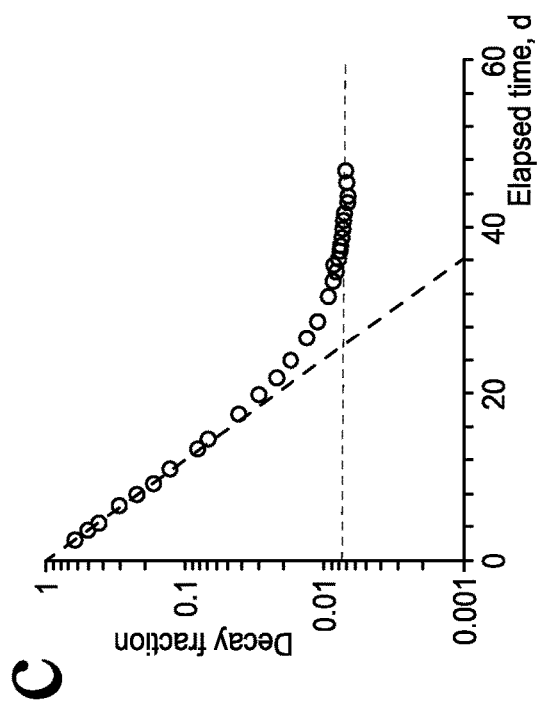

FIG. 21 depicts observed activity decay rate of TEVA cartridge $^{228}$Th load fraction (combined loads) for a 2 cc (a), a 1 cc (b), 0.4 cc HML (half-milliliter) (c), and 0.2 cc QML (quarter milliliter) cartridge (d). Black and grey dashed lines are the theoretical decay rate curves for $^{224}$Ra and $^{228}$Th, respectively. Positive deviation from the $^{224}$Ra curve indicates the presence of $^{228}$Th.

Figure 22:
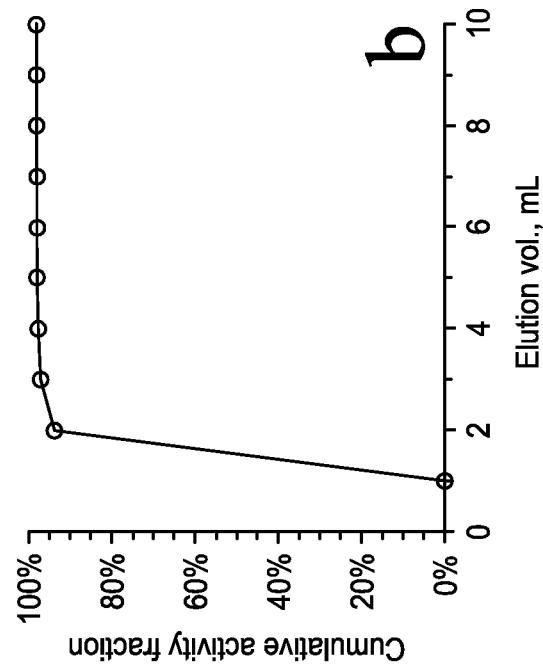
Figure 22:
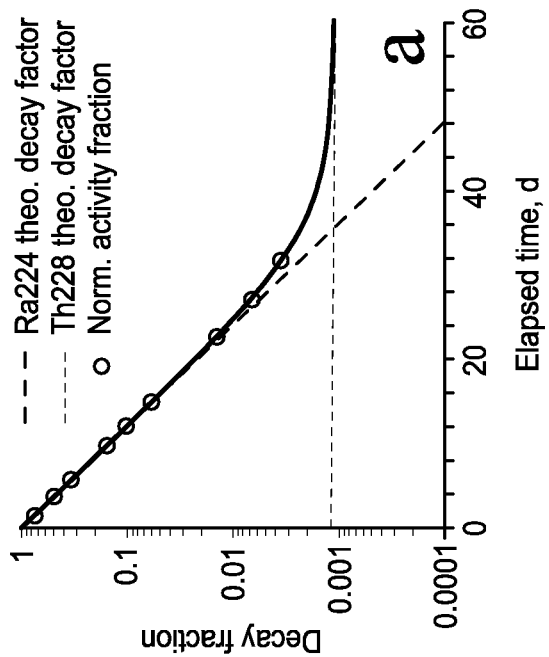

FIG. 22 (a) depicts observed activity decay rate of TEVA column $^{228}$Th load fraction for a 1 cc hand-packed TEVA resin SPE column. (b) depicts cumulative $^{228}$Th activity fractions as a function of 1 M HCl elution volume from same.

Figure 23:
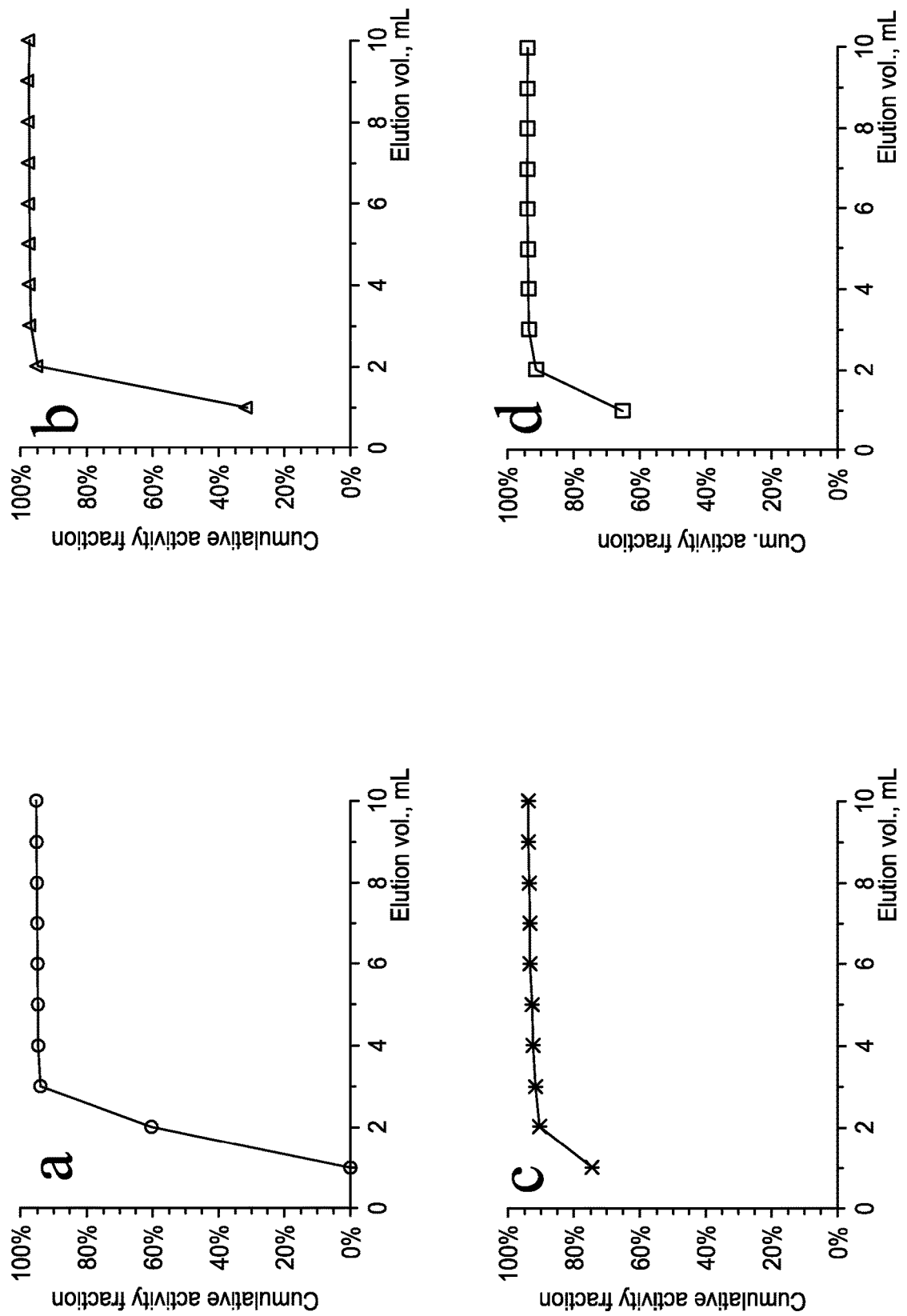

FIG. 23 depicts cumulative $^{228}$Th activity fractions as a function of 1 M HCl elution volume from machine-packed TEVA resin cartridges of decreasing internal resin volume. Cartridge are (a) 2 cc, (b) 1 cc, (c) HML, and (d) QML.

Figure 24:
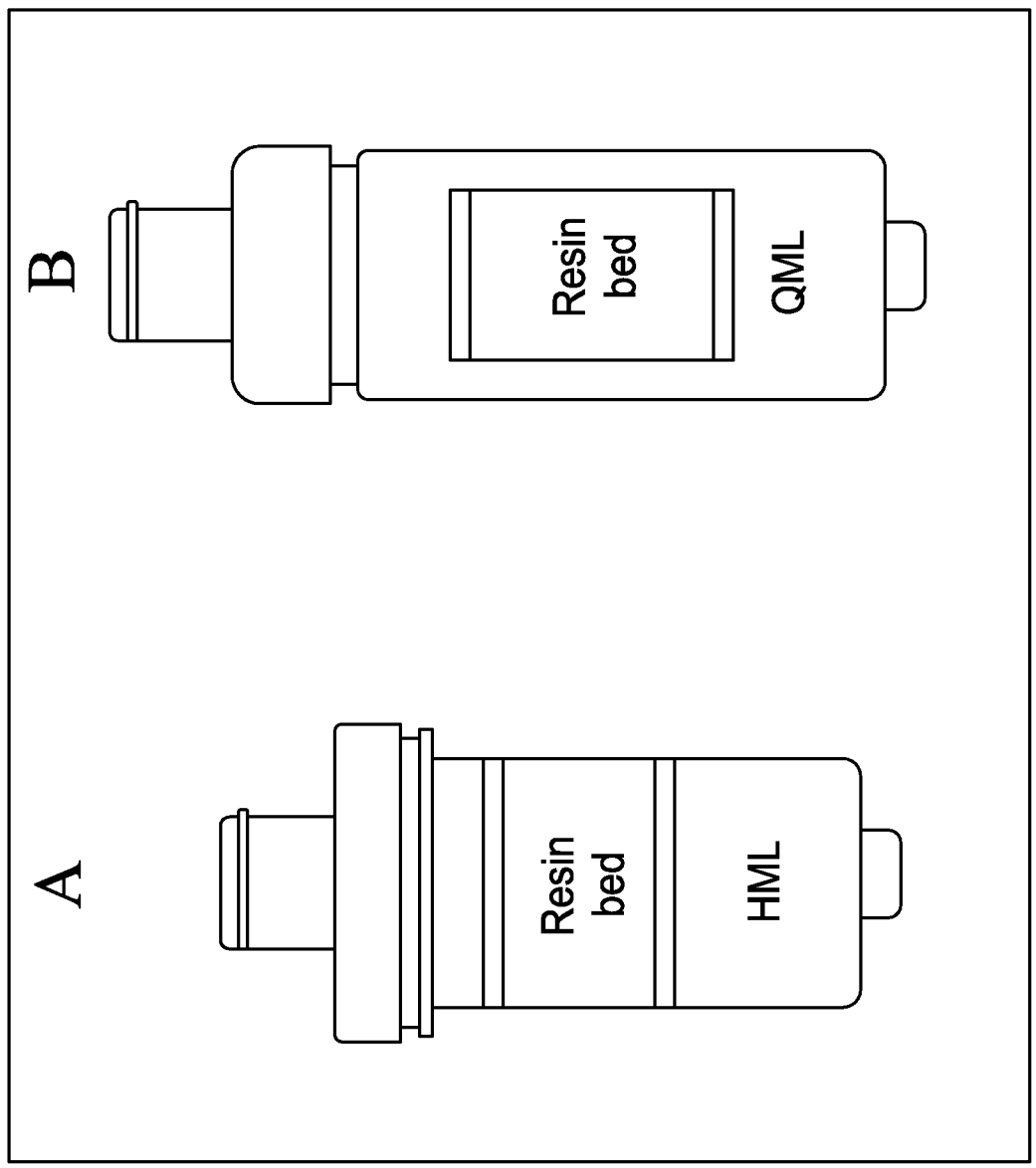

FIG. 24 is HML (0.41 cc) and QML (0.25 cc) cartridges that were evaluated for $^{212}$Pb removal in the C2 position.

Figure 25:
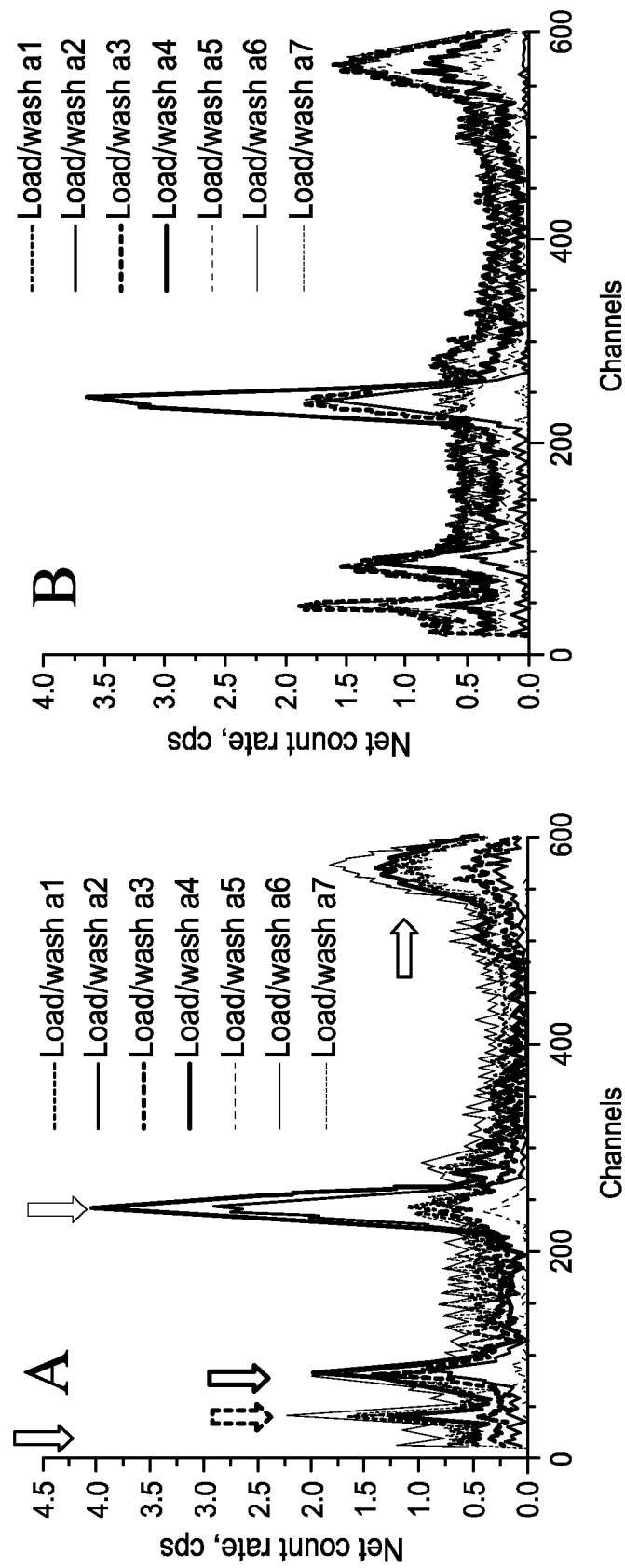

FIG. 25 is gamma spectra of $^{228}$Th/$^{224}$Ra solution effluent fractions from C1+C2 during the load+wash "a" steps in 6 M HNO$_3$. C2 volume was varied between 0.41 cc (A) and 0.25 cc (B) of Sr Resin bed. Colored arrows indicate radionuclides observable in the fractions: blue=$^{228}$Th (absent); grey=$^{212}$Bi; yellow=$^{212}$Pb; green=$^{224}$Ra; orange=$^{208}$Tl.

Figure 26:
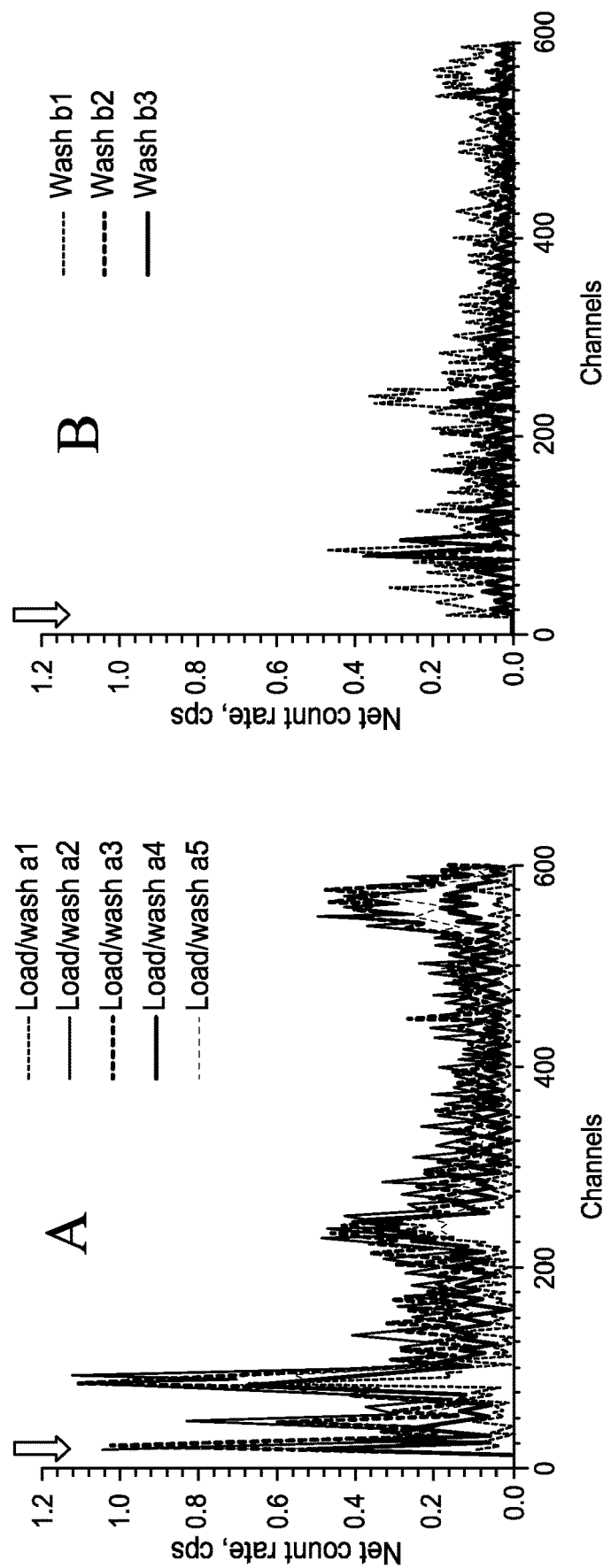

FIG. 26 depicts (A) load+wash "a" effluent fractions from a 0.25 cc Ra-01 resin showing the elution of $^{228}$Th (arrow), some $^{212}$Pb, and $^{212}$Bi/$^{208}$Tl. (B) effluent fractions from wash "b" showing no observable $^{228}$Th X-rays (arrow). $^{228}$Bi/$^{208}$Tl are observed to wash from the media.

Figure 27:
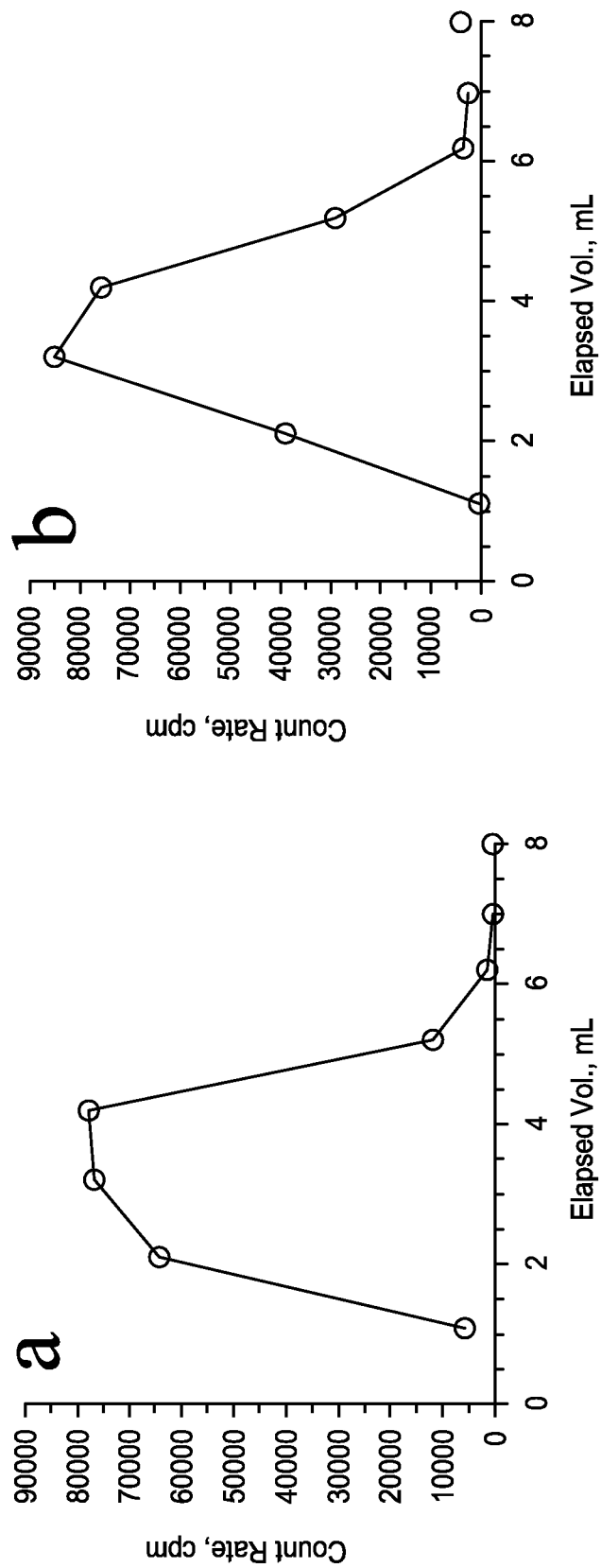

FIG. 27 is Load/wash "a" column effluent fractions showing 224Ra elution profile through C1+C2, wherein C2 is a (a) HML cartridge or a (b) QML cartridge packed with Sr Resin.

Figure 28:
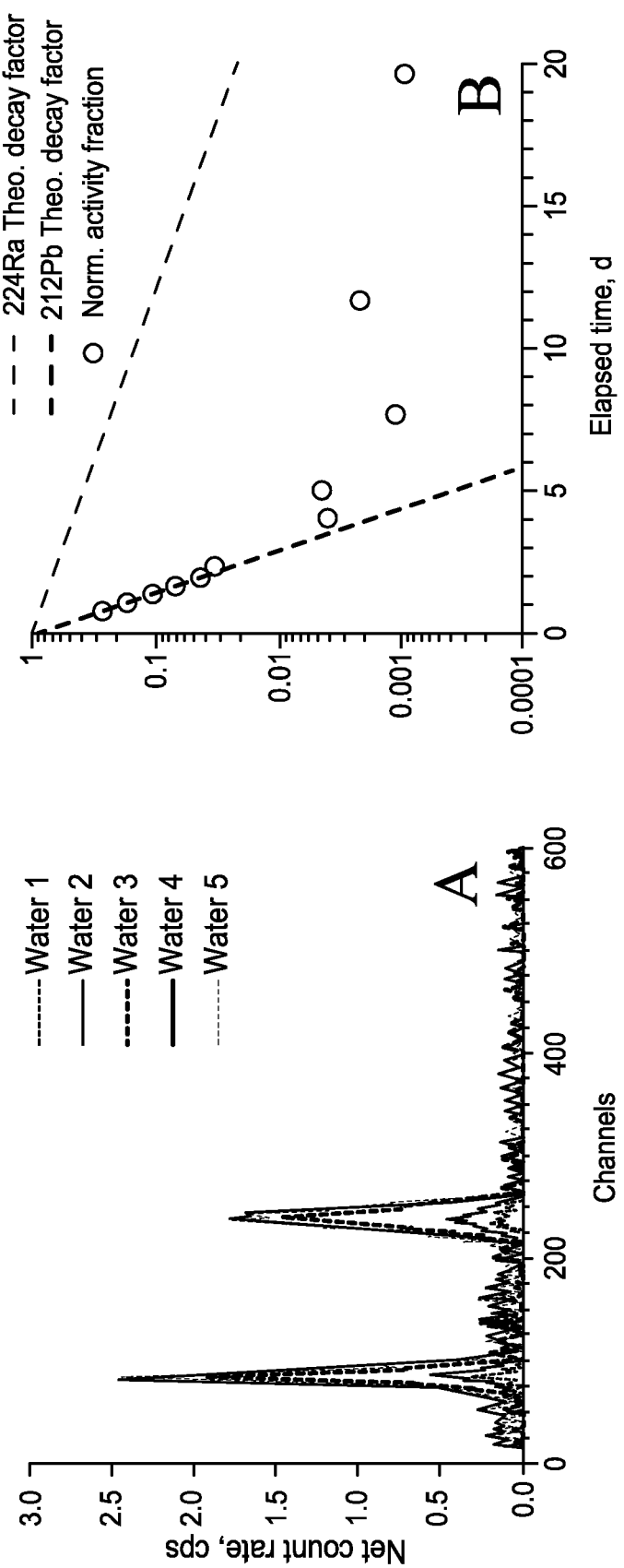

FIG. 28 depicts water wash fractions from the C3 step 3 that was inserted before the $^{224}$Ra elution step. (A) gamma spectra of effluent fractions collected during water wash show $^{212}$Pb removal. (B) the activity decay rate observed from water wash effluents; it matches the decay rate of $^{212}$Pb. Data indicates that $^{224}$Ra remains adsorbed to the media during water wash.

Figure 29:
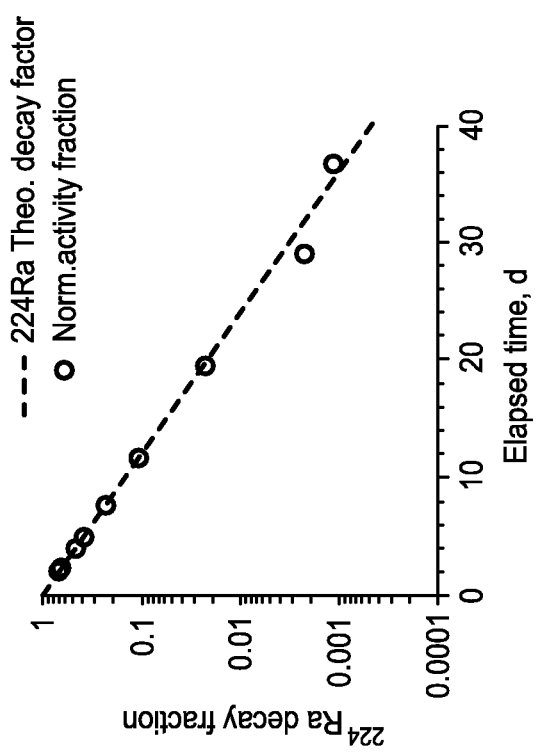

FIG. 29 depicts observed activity decay rate of the primary $^{224}$Ra elution fraction from a Ra-01 resin column (C3) loaded with a $^{228}$Th/$^{224}$Ra solution. Dashed line is the theoretical $^{224}$Ra decay rate.

Figure 30:
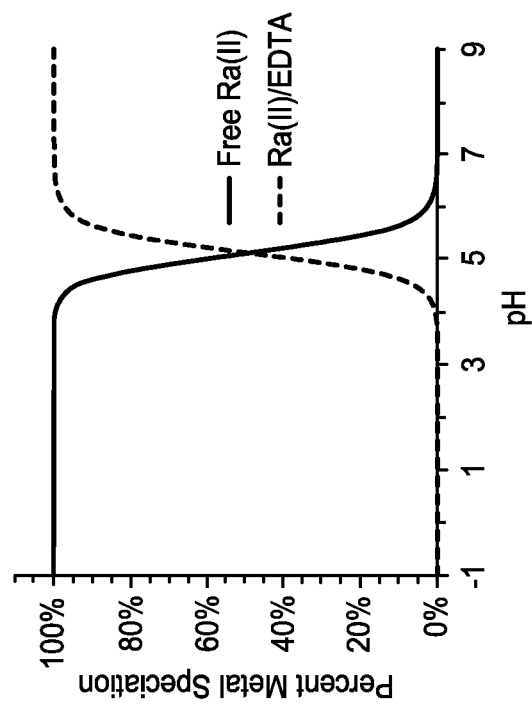

FIG. 30 is a speciation diagram for Ra(II) in 0.05 M EDTA across a range of pH.

Figure 31:
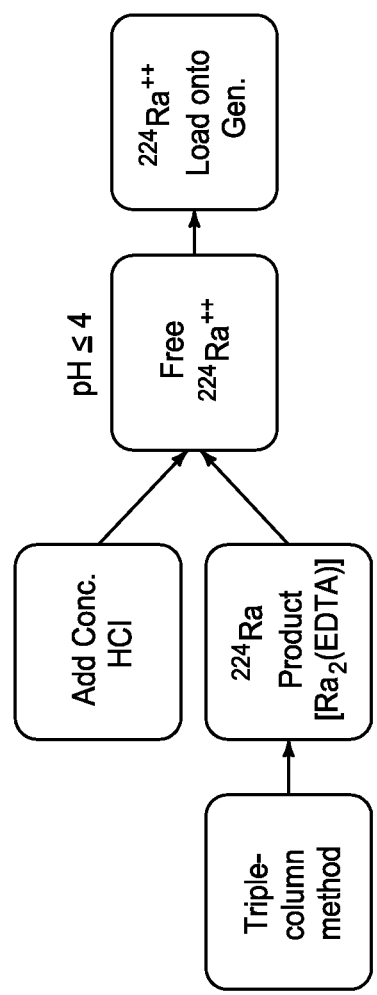

FIG. 31 is a schematic showing the process for loading the $^{224}$Ra product fraction from the triple-column method onto a CatIX-based generator column. The purified $^{224}$Ra/EDTA product solution is acidified by adding a small volume of concentrated HCl (other mineral acids such as HNO$_3$ are acceptable as well), which dissociates the $^{224}$Ra/EDTA complex. Next, the acidified $^{224}$Ra$^{++}$ solution is loaded onto the generator column.

Figure 32:
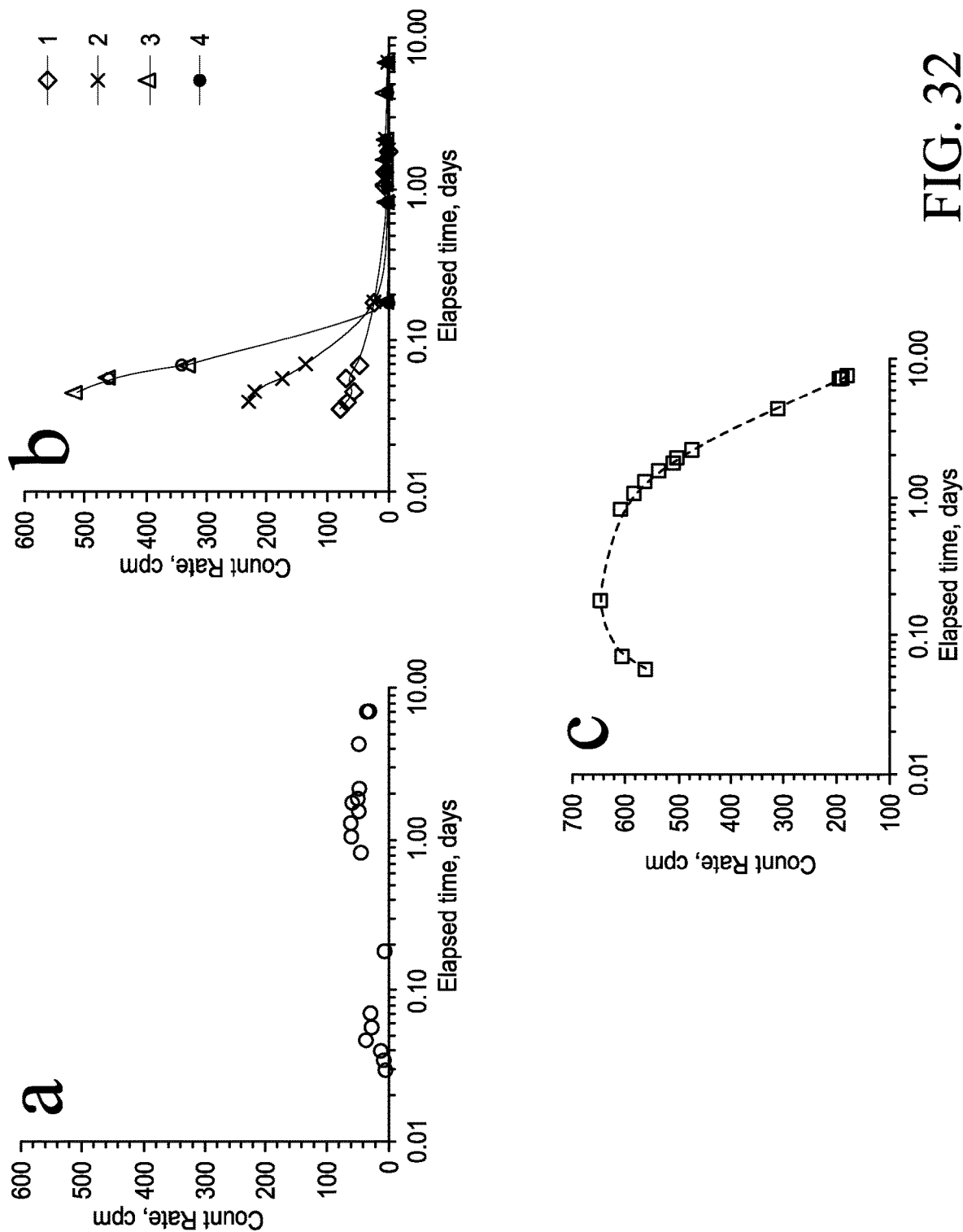

FIG. 32 depicts results from loading the HCl-acidified $^{224}$Ra$^{++}$ product onto a strong cation exchange column. $^{224}$Ra load fraction (a) and wash fractions (b) plotted vs. elapsed time. Legend indicates the collected fractions (1 mL each) of wash solution delivered through the vessel. The decay rates indicate that all $^{224}$Ra was adsorbed onto the column during load/wash steps. (c) Direct counts of the $^{224}$Ra-loaded cation exchange column vs. elapsed time indicates the decay rate of $^{224}$Ra beyond the ~1.6 day period wherein progeny equilibrium first occurs.

Figure 33:
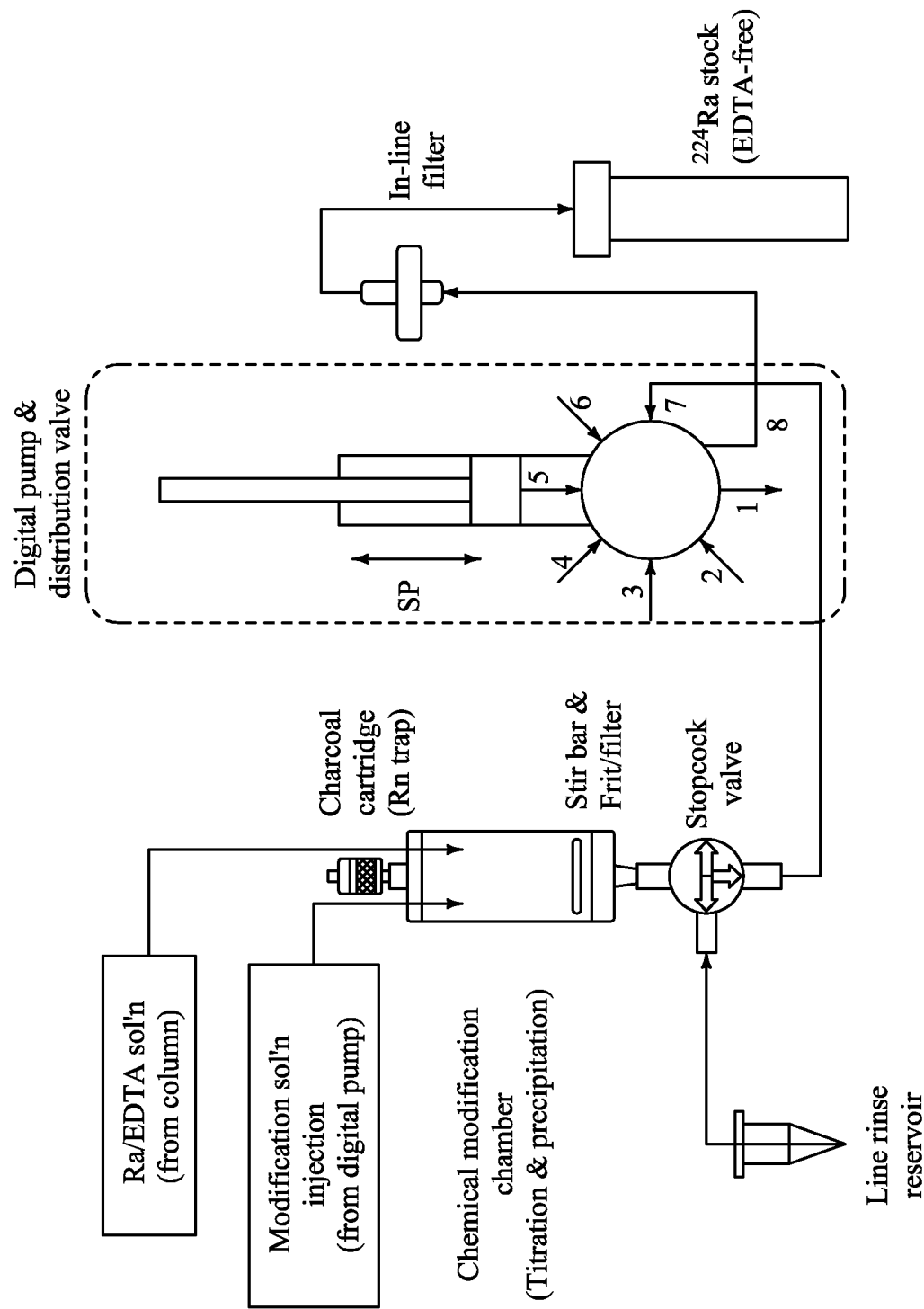

FIG. 33 is a schematic of a Ra-complex reaction system according to an embodiment of the disclosure.

DESCRIPTION

This disclosure is submitted in furtherance of the constitutional purposes of the U.S. Patent Laws "to promote the progress of science and useful arts" (Article 1, Section 8).

Figure 1:
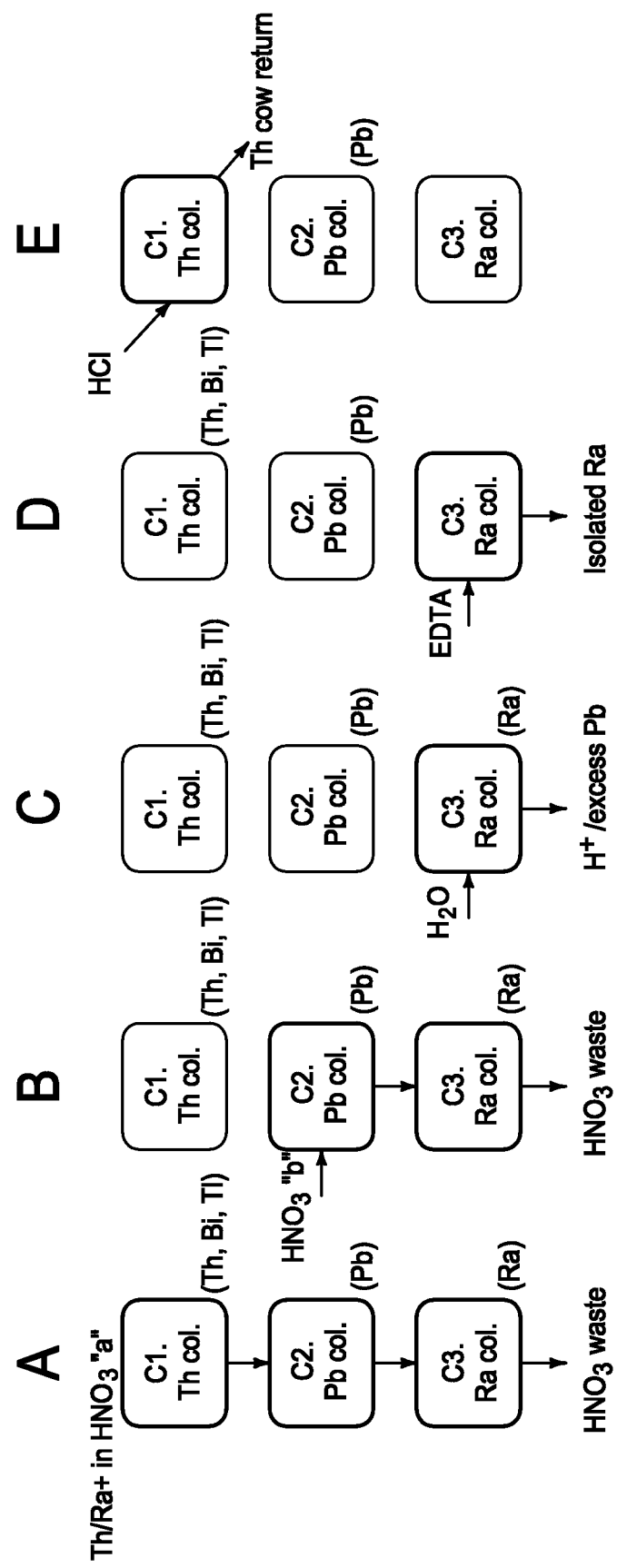
FIG. 1 depicts an example modified triple-column $^{224}$Ra isolation scheme; green cells indicate active flow paths at each step A through E. (A) Load and wash "a" to adsorb Th, Pb, and Ra on C1-C3, respectively; (B) Secondary wash "b" for C2-C3; (C) Water rinse through C3 to remove H$^+$ ions; (D) Ra elution from C3; and (E) Elution of Th from C1 for reuse.

The present disclosure will be described with reference to FIGS. 1-33. Referring first to FIG. 1, a series of configurations (A-E) of vessels (C1-C3) in fluid communication with one another is depicted.

The present disclosure provides systems and methods for the separation of materials that can be used for the acquisition of targets for alpha radiation when performing targeted radioimmunotherapy applications. In one example the $^{212}$Pb/$^{212}$Bi isotope pair shows good promise. The parent isotope, $^{224}$Ra, must be periodically purified from $^{228}$Th via radiochemical separation. The purified $^{224}$Ra can then be used to prepare $^{224}$Ra/$^{212}$Pb/$^{212}$Bi generators. The present disclosure provides a $^{224}$Ra purification method that can be safer and more efficient than existing prior art methods resulting in reduced personnel dose; and may be fully, but at least partially, automated using laboratory fluidics.

With reference to FIG. 1, the present disclosure provides systems and/or methods for separating Ra from a mixture comprising at least Ra, Pb, Bi, and Th. As can be seen in FIG. 1, there are three vessels (C1, C2, and C3), but there can be at least two. These vessels can house media. For example, C1 can house media M1, C2 can house media M2, and C3 can house media M3. One or all three of these vessels can be in fluid communication via conduits for example. Each of the conduits can be controlled via a valve or valves for example. Referring to FIG. 2, in accordance with an example implementation, a mixture (Th/Ra+ ("+" subsequent progeny can be present) in HNO$_3$) that can provide Ra, Pb, Bi, and Th, can be exposed to vessels C1-C3 and thereby M1-M3. Each of the Media can be different from one another.

Accordingly, the media can be (in fluidic introduction order, and as shown in Table 1) AnIX-M1 (AG MP-1M, Bio-Rad, or TEVA resin, Eichrom); 18-crown-6-M2 (Sr Resin, Eichrom); M3 (Ra-01 resin, IBC Advanced Technologies). In accordance with example implementations, a $^{228}$Th/$^{224}$Ra/$^{212}$Pb/$^{212}$Bi/etc. mixture can be passed through all three vessels in strong HNO$_3$ (≥6M, however concentrations as low as 2M HNO$_3$ can be utilized as well); a 3-column wash (strong HNO$_3$) can be delivered, and Th+Bi retains in C1; Pb retains in C2; Ra retains in C3 (the system configuration of which is shown in FIG. 2 as (A).

Accordingly, systems of the present disclosure can include a first vessel housing a first media and either Pb or Bi and/or Th (C1 or C2); and a second vessel in fluid communication with the first vessel, the second vessel housing a second media and Ra (C3), wherein the first media is different from the second media. Additionally, systems of the present disclosure can include a first vessel housing a first media and Th and/or Bi (C1); and a second vessel in fluid communication with the first vessel, the second vessel housing a second media and Pb (C2), wherein the first media is different from the second media. Embodiments of the present disclosure can also include systems having a first vessel housing a first media and Th or Bi (C1); a second vessel in fluid communication with the first vessel, the second vessel housing a second media and Pb (C2); and a third vessel in fluid communication with the second vessel, the third vessel housing a third media and Ra (C3), wherein at least one of the first, second, or third medias are different from the other medias.

Methods are also provided that can include providing a mixture having Ra, Pb, Bi, and/or Th; providing the described system having vessel (C1) housing the media (M1), and vessel (C2 or C3) in fluid communication with vessel (C1), with vessel (C2 or C3) housing media (M2 or M3); exposing the mixture to media (M1) within vessel (C1) to separate the Th and Bi from the Ra and Pb; then, through the fluid communication, exposing the remaining mixture to media (M2 or M3) in vessel (C2 or C3) to associate the Pb or Ra with the M2 or M3 media. In accordance with example implementations, Th (with Bi) of C1 can be eluted from M1 in strong HCl for dry-down and storage for re-use as desired.

Additionally, as shown and described, vessel (C3) can be in fluid communication with vessel (C2), and vessel (C3) and house a media (M3). The methods can include exposing the mixture to media (M1) within the vessel (C1) then, through the fluid communication, exposing the first remainder (that which passes through C1 or is washed through C1) to media (M2) in vessel (C2), then, through fluid communication, exposing the next remainder (that which passes through C2 or is washed through C2) to media (M3) in vessel (C3), the exposing separating the Th and Bi from the Ra and Pb, and the Ra from the Pb to sequester the Th and Bi in one vessel, the Pb in another vessel, and the Ra in still another vessel.

Upon distributing the materials within the system, and with reference to configuration B of FIG. 1, vessels C2 and C3 are washed with less strong or weaker HNO$_3$ (<7M, between 2M and 7M, or about 6M). In accordance with example implementations, M3 can then be washed with water to remove H$^+$/excess Pb in configuration C. In configuration D, Ra can be eluted from M3 (to which it was associated) with dilute EDTA solution (pH adjusted to >7), or a chelating solution with a bonding constant that is higher than that of Ra-01 resin. For example, Per FIG. 30, the Ra is EDTA bound ~100% at a pH of ~6, and is ~50% EDTA bound at pH ~5.3. Accordingly, methods of the present disclosure provide for separating Ra from being associated with a media by exposing the Ra and media to a chelating agent to form a mixture comprising the Ra complexed with the chelating agent.

The Ra/EDTA product solution is not compatible with loading onto a CatIX-based generator column. Adding enough HCl to the Ra/EDTA solution to drop the pH below ~2 (Per FIG. 30, Ra is freed from EDTA at pH ~4. By pH ~2, the EDTA is rendered insoluble and precipitates out, leaving Ra in supernate) can decouple or disassociate the Ra from the EDTA (thereby producing free Ra$^{++}$ ions in solution). The weakly acidified Ra$^{++}$ solution can then be adsorbed onto the CatIX-based generator column.

The systems and methods of the present disclosure can provide purified $^{224}$Ra product that can be loaded onto the CatIX generator column. Embodiments of the disclosure can be performed without boil-down or acid transposition steps. The purified Ra (without $^{212}$Pb and $^{212}$Bi progeny) can be handled in a low-dose state for several hours. This can allow for packing the generator column, removing the column from containment, and packing it for shipping before the dosage becomes an issue. Additionally, the present disclosure also provides fluidic systems to perform the methods. This can provide a fluidic platform.

TABLE 1

Commercial resins evaluated for the triple-column process to isolate $^{224}$Ra from $^{228}$Th.

| Column ID | Resin type | Resin ID | Particle size, μm | Manufacturer | Purpose |
|---|---|---|---|---|---|
| C1 | AnIXpoly [a] | AG MP-1M | 37-74 | Bio-Rad | Th extraction & recovery |
|  | AnIXorg [b] | TEVA | 50-100 | Eichrom |  |
| C2 | 18-C-6 [c] | Sr Resin | 50-100 | Eichrom | Pb extraction |
| C3 | 21-C-7 [d] | Ra-01 | 150-250 | IBC | Ra extraction & recovery |

[a] Functional group: Quaternary amine on macroporous polystyrene divinylbenzene copolymer.
[b] Functional group: Aliquat 336, an organic quaternary amine salt on Amberchrom CG-71 polymer support.
[c] Functional group: 18-crown-6 and 1-octanol on Amberchrom CG-71 polymer support.
[d] Functional group: Presumed to be a 21-crown-7 on silica support.

An example overall fluidic protocol for the modified triple-column method is shown in Tables 2 and 3.

TABLE 2

Protocol for modified triple-column purification of $^{224}$Ra from $^{228}$Th. Example resins and column volumes are included. [a]

| Step | Purpose | Column connections | Reagent | Reagent conc., M | Vol., mL |
|---|---|---|---|---|---|
| 1 | Col. condition | C1-C3 | HNO$_3$ | 6 | 5 |
| 2 | Load [b] | C1-C3 | HNO$_3$ | 6 | 3 |
| 3 | Wash a | C1-C3 | HNO$_3$ | 6 | 3 |
| 4 | Wash b | C2-C3 | HNO$_3$ | 2 | 5 |
| 5 | Water wash | C3 | H$_2$O | — | 5 |
| 6 | Ra elute | C3 | EDTA [c] | 0.05 | 5 |
| 7 | Th elute | C1 | HCl | 1 | 5 |

[a] C1 = 1 cc TEVA resin; C2 = 0.25 cc Sr Resin; C3 = 0.25 cc Ra-01 resin.
[b] $^{228}$Th in equilibrium with $^{224}$Ra and progeny.
[c] pH was adjusted to ~11.

TABLE 3

Description of Steps for the Schematic of FIG. 1.

| Step | Description |
|---|---|
| A | Load and wash "a" to adsorb Th, Pb, and Ra on Col. 1-3, respectively. |
| B | Secondary wash "b" for Col. 2-3 to assure complete transport of Ra between Col. 2 and 3. |
| C | Water rinse through Col. 3 to remove nitric acid. |
| D | Ra elution from Col. 3 via transchelation with EDTA solution. |
| E | Elution of Th from Col. 1 for recovery and eventual reuse. |

During Step A, the prepared $^{228}$Th/progeny stock solution (in 6 M HNO$_3$) can be passed through three columns, each fluidically interlinked. The 6 M HNO$_3$ concentration can provide high affinity of Th on the AnIX media (1) and high affinity of Pb on the Sr media (M2). During the load step, Th (and Bi/Tl daughters) are adsorbed on M1, Pb is adsorbed on M2, and Ra is adsorbed on M3.

Following up the load solution is wash "a", comprising 6 M HNO$_3$. This can provide for complete fluid transport of the load solution through the three tandem columns.

The Step A process efficacy is demonstrated by gamma spectra in FIG. 3. In this instance, M1 was an AnIX$_{poly}$. Solutions can be delivered to the three columns at 1 mL/min. The $^{228}$Th/progeny load (a) and initial "wash a" solution (b) triple-column effluent fractions can be collected in test tubes and counted by gamma spectrometer. It was observed that no activity was present from the fractions that has passed through all three columns during the load and wash "a" steps; all activity was adsorbed onto the columns.

Additionally, a direct gamma count of the C1 immediately after the completion of the load/wash "a" steps shows the presence of $^{228}$Th, $^{212}$Bi, and $^{208}$Tl (FIG. 3C). No $^{212}$Pb or $^{224}$Ra gamma peaks are observed on M1, as these radionuclides have been adsorbed onto M2 and M3, respectively.

The passage of $^{224}$Ra out of C1 and C2 can be confirmed by evaluating a wash "a" effluent fraction that was diverted away from C3. In FIG. 4, rather pure $^{224}$Ra in the C2 effluent can be observed, along with a trace of $^{212}$Bi and $^{208}$Tl. The absence of $^{212}$Pb spectral lines indicates the good collection efficiency of Pb on the Sr Resin (C2). Any freshly ingrown $^{212}$Bi and $^{208}$Tl daughters of the C2-bound $^{212}$Pb would likely not be retained on M2 during this step, but would rather be swept from C2 and pass through C3 to waste.

The role of M2 is to adsorb $^{212}$Pb from the $^{212}$Pb/$^{224}$Ra mixture that passes through C1. The 18-crown-6 ether extracting agent on the Sr Resin has strong affinity for Pb(II) ions, and low affinity for Ra(II) ions and Bi(III) ions in multi-Molar concentrations of HNO$_3$ (see FIG. 5 and FIG. 6). Consequently, $^{224}$Ra can pass through the Sr Resin and thereby collect onto M3. Any $^{212}$Bi generated by $^{212}$Pb on the M2 is unretained and will pass out of C2 along with $^{224}$Ra to C3. As the $^{212}$Bi is likewise unretained on M3, it will pass to waste while $^{224}$Ra is being loaded.

In Step B, C1 can be disconnected from the chain of vessels and remain static until the end of the method, when the adsorbed $^{228}$Th is recovered via a separate elution step. By disconnecting, the fluid communication is simply blocked off, but the conduit associated C1 and C2 can remain.

Wash "b", comprising 2 M HNO$_3$, can be passed through C2 and C3 to assure quantitative transfer of Ra from C2 to C3. The Pb is strongly bound onto M2 and remains there. 2 M HNO$_3$ can be used in this step because it provides the high level of affinity of Pb on the Sr Resin.

The Ra has a low level of affinity for the Sr Resin (M2) at 2 M HNO$_3$ (k'≈2, FIG. 6). This is evident by the slight retardation of Ra during the load/wash "b" step shown in FIG. 6 (b). Here, the $^{212}$Bi trace represents an unretained ion (k' of <0.4) passing through the vessel ahead of the $^{224}$Ra passage. Because of this slight Ra/resin affinity, wash "b" can require a volume of ~10 mL to assure complete Ra passage through the Sr Resin column.

The wash "b" process data is demonstrated in FIG. 7 (a). The C2/C3 effluent fractions show no indication of $^{212}$Pb or $^{224}$Ra breakthrough from the columns. Once wash "b" is complete, FIG. 7 (b) demonstrates that a pure $^{212}$Pb spectrum is observed on the Sr Resin column (C2).

Referring next to FIG. 8, in step C, C2 can be disconnected from C3, as M3 now contains the isolated $^{224}$Ra fraction. Again, the disconnection does not remove the conduit connecting vessels C2 and C3, it simply prohibits fluid flow through the conduit.

Water can be flushed through the C3 in order to remove the $HNO_3$ from the system. Ra remains strongly bound to M3 during the water flush as Ra affinity for Ra-01 resin increases as $HNO_3$ concentration drops. Additionally, the water wash through C3 can result in removal of $^{212}Pb$ that may reside on the column. This $^{212}Pb$ could be from C2 breakthrough or freshly ingrown $^{212}Pb$ produced by the M3-bound $^{224}Ra$. A series of five 1 mL water effluent fractions were collected and analyzed by gamma spectroscopy. The removal of $^{212}Pb$ from C3 during the water wash is shown in FIG. 9 (a). By evaluating the water fraction decay rate over time, it was confirmed that the water fractions did not contain $^{224}Ra$. The rate of activity loss was in agreement with the $^{212}Pb$ decay factor (FIG. 9 (b)). This indicates that no $^{224}Ra$ was co-eluted with $^{212}Pb$ during the water wash.

As $^{228}Th$, $^{212}Bi$, and $^{208}Tl$ are locked onto M1 of the now-disconnected C1 vessel and $^{212}Pb$ is locked onto M2 of the now-disconnected C2, and traces of $^{212}Pb$ on M3 were removed during the water rinse, the isolated $^{224}Ra$ that is bound onto M3 has a low associated dose rate. This is temporary, as progeny ingrowth quickly escalates dose on M3.

Referring next to FIG. 10, in Step D, the $^{224}Ra$ on M3 was eluted using 5 mL of 0.05 M EDTA that had been adjusted to pH 11 using NaOH. Column effluent fractions were collected, and gamma spectrometry was performed. The resulting radiochromatogram is shown in FIG. 11. In this $^{224}Ra$ elution, four milliliters contained the vast majority of the $^{224}Ra$ activity (it is contemplated that higher concentrations of EDTA, or a stronger chelating agent, or a smaller column volume, would result in sharper $^{224}Ra$ elution peaks).

The series of $^{224}Ra$ elution fractions was counted repeatedly over the course of ~35 days in order to gauge the decay rate and assess the radionuclidic purity of the $^{224}Ra$. FIG. 11 (B) shows that the rate of activity diminishment of the C3 elution product tracks with the theoretical $^{224}Ra$ rate of decay across several orders of magnitude. Importantly, the decay rate data indicates that no $^{228}Th$ is present in the $^{224}Ra$ product fraction, at least down to ~0.1% activity fraction.

Referring next to FIG. 12, the recovery of $^{228}Th$ from M1 of C1 can be performed. In accordance with example implementations, methods for separating Ra from Pb, Bi, and Th can include separating one or more of Bi and/or Th from the Ra. The separating can associate the Bi and/or Th with a media (M1). The method can further include disassociating the Bi and/or Th from the media (M1) to form a mixture comprising the Bi and Th and transferring the mixture to a vessel housing at least Ra and additional Bi and/or Th. This vessel can be considered a "cow" that through decay generates additional Ra which can be used to initiate step A.

Th was eluted from the $AnIX_{poly}$ media (M1) using 5 mL 8 M HCl. (Th can be eluted from 1M to 12M). About 8M will be sufficient if the concentration is sufficient to elute the Bi and/or Th. FIG. 13 (a) shows the resulting spectra from these Th elute fractions. The first and second elutions showed most of the recovered Th. Additionally, it was observed that $^{212}Bi$ and $^{208}Tl$ were eluted co-eluted with $^{228}Th$, primarily in the first elute fraction. Complete $^{228}Th$ recovery from the $AnIX_{poly}$ media (M1) was not possible in a 5 mL delivery of 8 M HCl. A direct count of C1 post-elution indicated that some fraction of Th remained on the column FIG. 13 (b). Subsequent to this $^{228}Th$ retention observation, 5 mL of 0.05 M EDTA (pH ~3.5) was passed through C1. This secondary elution treatment can provide improved Th removal from the M1.

Referring next to FIGS. 14 and 15, fluidic systems capable of performing the methods of the present disclosure in a fully automated fashion are provided. The fluidic system architecture is presented as a schematic in FIG. 14. The system was designed with an eye towards operation remotely or in a shielded facility. Two digital syringe pumps (SP1, SP2) are responsible for reagent delivery to the vessels (C1, C2, and C3); these pumps can be located outside of the shielded zone to minimize chances of radiolytic degradation.

Within the shielded zone can be a third syringe pump (SP3). This pump can include a stepper motor and a disposable plastic syringe, for example. A role of SP3 is to withdraw the $^{228}Th$ "cow" solution (the first mixture, for example) into the sample injection loop indicated at the top of FIG. 14 and in FIG. 15 (b) (upper left of image). Once the cow is loaded into the loop, the digital syringe pumps located outside of the shielded zone can access the cow solution in the loop and direct it through the columns.

As the stepper motor can drive the syringe pump from voltage signals originating outside the shielded zone, and the stepper motor has no integrated circuits within it, the chances of radiolytic degradation of this component is small. For example, two of these stepper motors can be irradiated using a 208 R/hr $^{137}Cs$ source within a hot cell. The motors received a total dose of 33,700 R over the course of 6.75 days. After removal of the motors from the hot cell, each was tested for functionality; both remained functional.

The fluids can be routed through a multitude of pathways using Teflon FEP tubing and solenoid-actuated valves that feature fluoropolymer wetted surfaces (FIG. 16 (b)). As the solenoids are electromagnetically actuated by voltages applied from outside the shielded zone, the potential for radiation-based component failure are low. The fluidic system can be routinely utilized in a fume hood (Or in a shielded location using multi-mCi levels of 228Th/224Ra) using $^{228}Th/^{224}Ra$ spiked solutions.

$^{228}Th$ elution performance between 1 M and 8 M HCl were compared. The results are shown in FIGS. 16 and 17.

As shown, the 8 M HCl demonstrated better $^{228}Th$ elution performance than in 1 M HCl. TEVA resin is an extraction chromatographic resin loaded with Aliquat 336, an organic quaternary ammonium salt. The load/wash "a"/elute performance of $^{228}Th$ on 1 cc TEVA resin columns was evaluated. Load/wash "a" was again performed using 6 M $HNO_3$, and elution was performed at 1 M and 8 M HCl.

The $^{228}Th$ load/wash "a" performance from C1 (1 cc TEVA resin) is shown in FIG. 18. No discernable breakthrough of $^{228}Th$ was observed. As with MP-1 M resin, $^{212}Bi$ and $^{208}Tl$ had low retention; they began breaking through the column at the third load/wash "a" fraction.

The subsequent C1 $^{228}Th$ elutions with 1 M (FIG. 18 A) and 8 M HCl (FIG. 18 C, D) are shown. Here, the reduced HCl concentration results in improved $^{228}Th$ recovery relative to that obtained from the stronger HCl concentration eluent. The use of lower concentration HCl is advantageous in a shielded environment, as less corrosion to the containment and equipment would be anticipated.

The 1 cc column elution recovery fractions for $^{228}Th$ from FIG. 16 (MP-1M) and FIG. 18 (TEVA resin) for 1 M ((A)/(B)) and 8 M ((C)/(D)) HCl eluents are provided in Table 4. From this table, it can be concluded that the optimal $^{228}Th$ elution recovery is obtained from a TEVA resin column, using 1 M HCl as the eluting solution.

TABLE 4

$^{228}$Th column yields (%) for MP-1M and TEVA resin columns (1 cc) as a function of ~1 mL elution fraction volumes in 1M and 8M HCl. Primary recovery fractions are indicated in large bolded print.

| Elution fraction (~1 mL) | TEVA resin, 1M HCl elute | TEVA resin, 8M HCl elute | MP-1M, 1M HCl elute | MP-1M, 8M HCl elute |
|---|---|---|---|---|
| 1 | 0.09% | 0.51% | 1.46% | 0.97% |
| 2 | 93.93% | 86.97% | 16.31% | 73.67% |
| 3 | 3.29% | 1.75% | 5.59% | 4.99% |
| 4 | 0.33% | 0.67% | 3.99% | 3.05% |
| 5 | 0.32% | 0.57% | 3.10% | 3.15% |
| 6 | 0.04% | 0.20% | 2.53% | 0.86% |
| 7 | 0.03% | 0.19% | 2.21% | 0.72% |
| 8 | 0.04% | 0.17% | 1.96% | 0.60% |
| 9 | 0.04% | 0.11% | 1.79% | 0.73% |
| 10 | 0.03% | 0.21% | 1.83% | 0.80% |
| Cumulative HCl elute | 98.13% | 91.35% | 40.77% | 89.53% |
| EDTA strip [a] | 0.19% | 2.88% | 23.22% | 2.70% |
| Total recovery | 98.32% | 94.23% | 63.99% | 92.23% |

[a] Cumulative activity fraction from a 5 mL 0.05M EDTA (pH 3.5) strip, applied at the conclusion of the HCl elution.

As shown in Table 4, TEVA resin and MP-1 M can have a roughly equivalent ability to adsorb $^{228}$Th from a load solution in a 6 M HNO$_3$ matrix. 8 M HCl provides better (but incomplete)$^{228}$Th elution from MP-1M relative to 1 M HCl. TEVA resin can provide improved $^{228}$Th elution profiles relative to MP-1 M in both 1 M and 8 M HCl. $^{228}$Th elution profiles from TEVA resin are better in 1 M HCl vs. 8 M HCl.

Other column geometries and volumes may be utilized as well. For example, the 1 cc SPE column geometry described above (0.56×4.5 cm) as well as 0.61×0.865 cm (0.25 cc volume, QML cartridge).

The results of the evaluation are shown in FIG. 19 (A), where the $^{228}$Th elution profile is plotted (fractions were aged 32 days to allow $^{228}$Th progeny ingrowth). The smaller-volume column resulted in earlier 228Th release; $^{228}$Th yield reached ~96% after a 3 mL elution (FIG. 19 (B)). In comparison, the 1 cc column began its elution at the 2nd 1 mL fraction, and recovery reached ~94% after a 3 mL elution. These recoveries are within experimental uncertainty of each other.

Parallel column evaluations were performed with identical $^{228}$Th load solutions (6 M HNO$_3$) through a 1 cc and a 0.25 cc column of TEVA resin. The load effluents, which contain $^{224}$Ra, were collected and aged over a ~1 month period. The decay rate of the $^{224}$Ra-bearing TEVA effluent fraction can be used to determine its degree of purity from $^{228}$Th. The results are shown in FIG. 20 (a) for a 1 cc and in FIG. 20 (b) for a 0.25 cc TEVA media. There can be a divergence of the $^{224}$Ra-bearing fraction decay rate from the theoretical $^{224}$Ra decay rate lay beyond ~28 d for the 1 cc column and beyond ~12 d for the 0.25 cc column. The 0.25 cc column can exhibit significantly greater $^{228}$Th breakthrough during the load step than the 1 cc column.

TABLE 5

TEVA resin cartridges and column evaluated for $^{228}$Th sorption, desorption, and breakthrough. [a]

| Col. ID | Inner radius, cm (top, bottom) | Height, cm | Calc. volume, cm$^3$ | Residence time, s [b,c] | Linear flow velocity, cm/s [b] |
|---|---|---|---|---|---|
| 2 mL Cartridge | 0.46 0.43 | 2.58 | 1.60 | 1.45 | 0.40 |
| 1 cc SPE tube | 0.28 0.28 | 4.50 | 1.11 | 1.00 | 1.00 |
| 1 mL Cartridge | 0.46 0.43 | 1.37 | 0.85 | 0.77 | 0.40 |
| HML Cartridge [d] | 0.43 0.42 | 0.70 | 0.39 | 0.36 | 0.43 |
| QML Cartridge [e] | 0.30 0.29 | 0.77 | 0.21 | 0.19 | 0.90 |

[a] Some column chambers are slightly tapered cylinders; reported volumes based on a conical frustum.
[b] Normalized value, relative to the 1 cc SPE column
[c] Transit time for non-retained species in the resin bed.
[d] HML = "half-milliliter" QML = "quarter-milliliter"

In both cases, the column effluent fractions were aged a minimum of 40 days to allow for complete $^{228}$Th progeny ingrowth. The resulting $^{228}$Th+progeny gamma spectra was used to quantify the $^{228}$Th activity in each fraction.

The four TEVA resin cartridges and the TEVA resin SPE column listed in Table 5 received identical $^{228}$Th-spiked solutions in 6 M HNO$_3$. Delivered flow rate was 1 mL/min. C1 effluents were collected and aged for up to two months. During this time, the decay rate of each $^{224}$Ra-bearing TEVA load/wash "a" effluent fractions were tracked to determine its degree of purity over $^{228}$Th. The results are shown in FIG. 21 for the four machine-packed cartridges and FIG. 22 (a) for the hand-packed 1 cc SPE tube.

Accordingly, a 1 cc and 0.25 cc TEVA resin provided roughly equivalent $^{228}$Th elution yields after a 3 mL elution volume in 1 M HCl (FIG. 19). The 1 cc TEVA resin retained a greater fraction of $^{228}$Th during the load/wash "a" step than the 0.25 cc column volume, as some $^{228}$Th breakthrough was observed (FIG. 20). The 1 cc TEVA resin therefore provides a higher purity $^{224}$Ra fraction passing into the remaining fluidic system.

The measured column load fraction activity values can begin to deviate from the theoretical $^{224}$Ra decay curve at progressively earlier elapsed times as the cartridge bed volume decreases. These observed decay curve deviations can be related to increasing levels of $^{228}$Th in the $^{224}$Ra-bearing column load fractions. Next, the $^{228}$Th decay profile can be fitted atop the data points that lay beyond 40 elapsed days. Extrapolation of the curve to the y-intercept provided an estimate of the $^{228}$Th activity fraction present in the $^{224}$Ra-bearing column load effluents. It is observed that the calculated $^{228}$Th activity fraction increases as the TEVA cartridge volume decreases (FIG. 21, grey dashed lines).

These calculated $^{228}$Th activity fractions are presented in Table 6. From these, $^{228}$Th decontamination factors (DF) in the $^{224}$Ra-bearing TEVA column load fractions can be obtained. The QML cartridge (the smallest TEVA resin bed volume evaluated) had a surprisingly high calculated $^{228}$Th load/wash "a" breakthrough of ~1.6% (DF=61). This breakthrough fraction can be reduced to 0.018% for the largest bed volume (2 mL) cartridge (DF=548).

TABLE 6

Observed performance of TEVA resin columns/cartridges of the resin bed geometries listed in Table 5: $^{228}$Th decontamination factors (DF) in the $^{224}$Ra elution fraction, and $^{228}$Th yields from the load/wash/elute process.

| Col. ID | $^{228}$Th activity Fraction (×10$^{-3}$) $^a$ | $^{228}$Th DF $^b$ | $^{228}$Th elution yields, % $^c$ |
|---|---|---|---|
| 2 mL Cartridge | 1.82 | 548 | 95 |
| 1 cc SPE tube | 1.20 | 833 | 98 |
| 1 mL Cartridge | 2.65 | 377 | 97 |
| HML Cartridge $^d$ | 7.47 | 134 | 94 |
| QML Cartridge $^e$ | 16.3 | 61 | 94 |

$^a$ Values based on $^{228}$Th "load" fraction decay profiles.
$^b$ Obtained from the inverse of $^{228}$Th activity fraction
$^c$ Values based on sum of column load/wash/elute fractions (see cumulative yield traces in FIG. 22 and FIG. 23).
$^d$ HML = "half-milliliter"
$^e$ QML = "quarter-milliliter"

It is interesting to note that the $^{228}$Th activity fractions for the four Eichrom TEVA resin cartridge type load/wash "a" effluents follow a negative power function when modeled against each cartridge's resin bed volume (provided in Table 5). The modeled curve is y=0.00268x$^{-1.1112}$ (R$^2$=0.9797), and, the 1 cc SPE tube activity fraction does not fit this curve.

It is noted that the data presented may indicate that the hand-packed 1 cc SPE tube provided the highest $^{228}$Th decontamination factor (even higher than the 2 cc TEVA cartridge).

The second cartridge/column performance evaluation was to assess the quality of the $^{228}$Th elution profile. After the load/wash "a" solution had been delivered to each of the TEVA cartridges shown in Table 6, the $^{228}$Th was eluted with 10 mL of 1 M HCl, delivered at 1 mL/min. Approximately 1 mL fractions were collected. The cumulative $^{228}$Th fraction yields are shown for the four TEVA resin cartridge types in FIG. 23.

The $^{228}$Th elution profiles are consistent with the anticipated peak broadening associated with increasing TEVA resin bed volumes. However, even for the largest (2 mL) TEVA cartridge, the $^{228}$Th recovery was virtually complete after the third fraction. The $^{228}$Th cumulative yield for the 1 cc SPE tube is shown in FIG. 22 (b) its yield is likewise virtually complete after 3 mL of eluent. The $^{228}$Th elution yields, calculated from the sum of all load/wash/elute fractions, is shown in Table 6. $^{228}$Th elution yields between 94% and 98% were observed, and this spread is within experimental uncertainty.

The machine-packed/commercially available TEVA cartridges exhibited $^{228}$Th breakthrough levels that increased with decreasing cartridge bed volume. The hand-packed 1 cc SPE tube provided the least degree of $^{228}$Th breakthrough vs. the cartridges. The TEVA SPE vessel and cartridges exhibited nearly complete $^{228}$Th elutions after 3 mL of 1 M HCl eluent had been delivered at 1 mL/min. Overall, the hand-packed 1 cc SPE TEVA column provided a higher-purity $^{224}$Ra fraction relative to the machine-packed TEVA cartridges.

Regarding Media M2, the 18-crown-6 ether extracting agent on the Sr Resin column has strong affinity for Pb(II) ions, and low affinity for Ra(II) ions and Bi(III) ions in HNO$_3$. Consequently, $^{224}$Ra is able to pass through the Sr Resin column be collected onto C3, Ra-01 resin). The $^{212}$Bi, which passed with $^{224}$Ra through the C2, is likewise unretained on Col. 3—so this dose-causing radionuclide is sent to waste while $^{224}$Ra is being loaded. The $^{212}$Pb removal by C2, and the transference to waste of $^{212}$Bi following C3 can reduce the radiological dose imparted by $^{224}$Ra progeny.

The HML (0.41 cc) and QML (0.25 cc) both from Eichrom, as shown in FIG. 24 may be used for M2. The Sr Resin-bearing cartridges were loaded into the triple-column system in the C2 slot, and the C1 slot was configured with 1 cc TEVA resin columns. No C3 was installed. C1→C2 effluent fractions were collected during the $^{228}$Th/$^{224}$Ra column load+wash "a" steps.

The results for the 0.41 cc HML and the 0.25 cc QML cartridge effluents are shown in FIG. 25 (A) and FIG. 25 (B), respectively. The gamma spectra (FIG. 25) are virtually the same; in both cases, $^{212}$Pb was successfully scrubbed from the $^{224}$Ra-bearing stream. The cartridges are between 0.41 cc and 0.25 cc in volume, and each of these performed virtually the same at removing $^{212}$Pb from the $^{224}$Ra-bearing load stream.

In accordance with another example implementation, $^{228}$Th/$^{224}$Ra can be provided as a solution directly through C3, and C3 effluent fractions collected throughout the process.

The load+wash "a" fraction gamma spectra are shown in FIG. 26 (A), and the wash "b" fractions are shown in FIG. 26 (B). $^{228}$Th can be eliminated from the Ra-01 column during the wash "a" steps. During the wash "b" steps, no $^{228}$Th is apparent; the $^{228}$Th has been largely eliminated from C3. This data indicates that any $^{228}$Th that may break through C1 and into the downstream fluidic system during the load/wash "a" step would pass, unretained, through the Ra-01 resin.

The spectra above also indicates that $^{212}$Bi/$^{208}$Tl is largely unretained on the Ra-01. There is an obvious absence of $^{212}$Pb in the Ra-01 effluent fractions; $^{212}$Pb may be retained on Ra-01 resin (which is why C2 (Sr Resin) is upstream to the Ra-01 resin column to strip it out).

In accordance with example implementations, a water wash can be placed between wash "b" and the $^{224}$Ra elution step. The water would be used to remove residual H$^+$ ions from the column prior to the introduction of the pH ~11 $^{224}$Ra eluent solution.

The impact of the water wash through the Ra-01 resin is shown in FIG. 28 (A). $^{212}$Pb (retained on the Ra-01 column due to the lack of C2 upstream in this experiment) is removed from the vessel in water. An evaluation of the decay rate of these column effluent fractions indicated that $^{224}$Ra was not present (FIG. 28 (B)). Therefore, indications were that the water wash could be employed to eliminate excess H+ ions (preventing EDTA precipitation) and further remove $^{212}$Pb from the Ra-01 resin (thus reducing $^{224}$Ra product dose) without impacting $^{224}$Ra elution yield.

It is preferable that the wash "a" volume is sufficient to assure passage of $^{224}$Ra through C1 and onto C2/C3 (Step A), and the wash "b" volume is sufficient to assure passage of $^{224}$Ra through C2 and onto C3 (Step B). The load/wash "a" volumes shown in FIG. 27 are therefore more than adequate to accomplish the Step A objective.

Following the water wash, the Ra-01 resin contained isolated $^{224}$Ra. The $^{224}$Ra was eluted using the EDTA solution, and the eluent fraction's decay rate was monitored to evaluate its radionuclidic purity.

The results presented in FIG. 28 indicate that the addition of a water wash between wash "a" and the $^{224}$Ra elution serves to eliminate H+ ions from the column, which in turn eliminates acidification of the basic EDTA-based $^{224}$Ra eluent. Additionally, the water wash was observed to remove $^{212}$Pb from the column, while $^{224}$Ra was retained.

The results presented in FIG. 29 indicate that the single-column (C3) separation of $^{224}$Ra from $^{228}$Th with the Ra-01 resin is capable of a 000-fold decontamination factor (decontamination factor determination was limited by dynamic range of the analysis method). In other words, ≤0.1% of any $^{228}$Th that manages to break through C1 during the load/wash "a" step (the two steps wherein all three columns are inter-connected) would be expected to be found in the $^{224}$Ra elute. It is believed that the C1 $^{228}$Th retention factor is at least 1000. If this is so, then the approximate $^{228}$Th decontamination factor across the entire triple-column method is ≥1×10$^6$.

While the radionuclidic purity of $^{224}$Ra is essential in providing a robust isotope product, it is just as important that the output of the triple-column method be amenable to existing and future $^{224}$Ra/$^{212}$Pb generators.

For the existing $^{224}$Ra/$^{212}$Pb generator design, the $^{224}$Ra source is loaded onto a CatIX resin column (using AG MP-50 resin beads). Therefore, the Ra output from the triple-column method should be amenable to direct loading onto CatIX resin. Unfortunately, the purified Ra product, delivered in dilute EDTA solution (pH adjusted to >7), will not bind to CatIX resin as a free divalent cation; according to the speciation plots for Ra/EDTA mixtures (FIG. 30), Ra is completely bound to EDTA above pH 7. The chelated complex likely progresses from NaRa(EDTA) to Na$_2$Ra(EDTA) as the pH increases above 7. However, at pH values near 5, the Ra/EDTA complex is ~50%, and at pH values ≤4, the Ra++ cation is completely dissociated from the EDTA complex.

The information presented above indicates that lowering the $^{224}$Ra/EDTA product solution pH to 4 will result in free Ra++ cation in solution. The schematic shown in FIG. 31 provides a pathway to binding free Ra++ onto a generator column packed with AG MP-50 CatIX resin.

One milliliter of the isolated $^{224}$Ra product (5 mL) resulting from the triple-column separation can be acidified using 21.7 μl of concentrated HCl (0.26 mmoles H+ added). Next, the acidified solution can be delivered to a MP-50 resin at 0.5 mL/min. The data in FIG. 32 (a) shows the activity observed in the column load effluent fraction as a function of elapsed days. Virtually no activity is present in the column effluent solution. Subsequent to media load, the media can be washed with five 1 mL fractions of dilute HCl solution (FIG. 32 (b)). An elution of a short-lived daughter isotope is observed immediately after the fractions were collected; the isotope decays away within the first ~0.18 days (~4 h), and this shows now bleed-through of $^{224}$Ra during the wash. Continuous counting of the CatIX column over ~7 days shows the characteristic decay rate of $^{224}$Ra beyond ~1.6 days (FIG. 32 (c)).

The results in FIG. 32 indicate that acidification of the isolated $^{224}$Ra product fraction can provide for quantitative loading of the $^{224}$Ra onto a CatIX column. Therefore, the triple-column method appears to be well suited to the subsequent $^{224}$Ra/$^{212}$Pb generator column preparation via a simple solution acidification step.

As can be seen in FIG. 33, at least one schematic depiction of the preparation of the Ra++ is shown. The chemical modification chamber can receive the $^{224}$Ra eluent directly from the triple-column method Step D. Within this chamber, acid can be injected to reduce the solution pH to a point in which the Ra/EDTA complex is eliminated, thereby producing free $^{224}$Ra++ ions in solution (per FIG. 30). A stir bar ensures efficient mixing of acid into the $^{224}$Ra eluent.

If the solution is acidified to ~pH 2, not only does the 224Ra++ dissociate from the Ra/EDTA complex, but the EDTA precipitates from the solution. Once the precipitate is fully formed, the supernate can be withdrawn from the base of the chemical modification chamber, through a hydrophobic polyethylene frit for example, thereby removing the EDTA from the $^{224}$Ra++ solution.

TABLE 7

Syringe pump distribution valve port and descriptions of system illustrated in FIG. 33.

| Port | Port Description |
|---|---|
| 1 | Waste (out) |
| 2 | DI water (in) |
| 3 | Air (in) |
| 4 | Closed |
| 5 | Closed |
| 6 | Closed |
| 7 | Ra filtrate line (in) |
| 8 | Col. Packing system line (out) |

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A method for separating Ra from Pb, Bi, and Th, the method comprising:
providing a first mixture comprising Ra, Pb, Bi, and Th;
providing a system comprising:
a first vessel housing a first media; and
a second vessel in fluid communication with the first vessel, the second vessel housing a second media;
exposing the first mixture to the first media within the first vessel to separate the Th and Bi from the Ra and Pb and form a second mixture comprising the Ra and Pb; then, through the fluid communication, exposing the second mixture to the second media in the second vessel to associate the Pb with the second media and form a third mixture comprising the Ra.

2. The method of claim 1 wherein the Th and Bi are associated with the first media in the first vessel.

3. The method of claim 2 further comprising exposing the first media and Th and Bi to a strong HCl solution to elute the Th and Bi from the first media.

4. The method of claim 2 further comprising drying down the eluant of Th and Bi for storage and/or reuse.

5. The method of claim 1 further comprising exposing the third mixture to a third media to associate the Ra of the third mixture with the third media.

6. The method of claim 5 further comprising exposing the third media associated with the Ra to a chelating solution to remove the Ra.

* * * * *